United States Patent
Kurose et al.

(10) Patent No.: US 7,076,540 B2
(45) Date of Patent: Jul. 11, 2006

(54) SERVICE ASSIGNMENT APPARATUS

(75) Inventors: Yoshitoshi Kurose, Kawasaki (JP); Yuji Nomura, Kawasaki (JP); Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 787 days.

(21) Appl. No.: 09/788,842

(22) Filed: Feb. 20, 2001

(65) Prior Publication Data
US 2001/0056459 A1 Dec. 27, 2001

(51) Int. Cl.
G06F 15/173 (2006.01)

(52) U.S. Cl. .................... 709/223; 709/224

(58) Field of Classification Search ........... 709/223, 709/224; 707/10; 370/229–240
See application file for complete search history.

(56) References Cited

U.S. PATENT DOCUMENTS

| | | | |
|---|---|---|---|
| 5,581,558 A * | 12/1996 | Horney et al. | 709/230 |
| 5,742,772 A | 4/1998 | Sreenan | |
| 5,889,954 A * | 3/1999 | Gessel et al. | 709/223 |
| 6,356,863 B1 * | 3/2002 | Sayle | 703/27 |
| 6,539,425 B1 * | 3/2003 | Stevens et al. | 709/220 |
| 6,563,793 B1 * | 5/2003 | Golden et al. | 709/227 |

FOREIGN PATENT DOCUMENTS

| | | |
|---|---|---|
| CA | 2186795 | 5/1997 |
| CA | 2196006 | 8/1997 |
| CA | 2224038 | 6/1998 |
| EP | 0774878 A2 | 5/1997 |
| EP | 0790751 A2 | 8/1997 |
| EP | 0847221 A2 | 6/1998 |
| JP | 9-214488 | 8/1997 |
| JP | 9-247190 | 9/1997 |
| JP | 10-173662 | 6/1998 |

\* cited by examiner

*Primary Examiner*—Jeffrey Pwu
*Assistant Examiner*—Phuoc H. Nguyen
(74) *Attorney, Agent, or Firm*—Katten Muchin Rosenman LLP

(57) ABSTRACT

A service assignment apparatus sets an appropriate service in a service-request-incompatible apparatus as a network element so as to guarantee the service in the entire network. A service-request-compatible apparatus processes a received network-service request, and provides a service. A network-information collection unit in the service assignment apparatus collects information on a service-provision state of the service-request-compatible apparatus. A target-apparatus determination unit determines a service-request-incompatible apparatus based on the collected information on the service-provision state. A service mapping unit determines a service which the service-request-incompatible apparatus can provide, based on the information on the service-provision state and information on the determined service-request-incompatible apparatus. A service setting unit sets the service in the service-request-incompatible apparatus.

10 Claims, 21 Drawing Sheets

BANDWIDTH-RESERVATION-DECISION POLICY TABLE

| USER NAME | MAXIMUM AMOUNT OF RESERVED BANDWIDTH |
|---|---|
| K u r o s e | 5 M b p s |
| N o m u r a | 1 0 M b p s |

FIG. 6

PATH INFORMATION TABLE

| USER NAME | NEXT APPARATUS ON THE PATH |
|---|---|
| B | C |
| F | G |
| B | E |

B : ROUTER 50
C : ROUTER 70
E~G : OTHER ROUTERS IN THE NETWORK

FIG. 7

SERVICE MAPPING TABLE

| USER NAME | AMOUNT OF RESERVED BANDWIDTH | PRIORITY ASSIGNMENT |
|---|---|---|
| Kurose | 5Mbps | 3 |
| Nomura | 10Mbps | 6 |

FIG. 8

DYNAMIC-NETWORK-INFORMATION TABLE

| SECTION OF PATH | CONGESTION |
|---|---|
| A – B – C – D | NO |
| E – F | YES |

FIG. 14

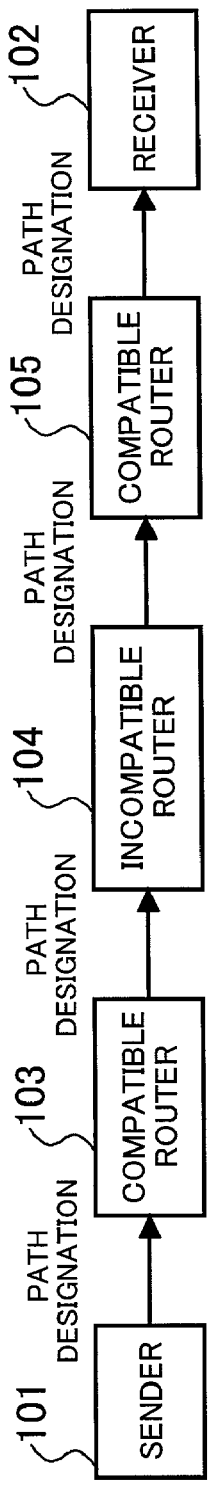
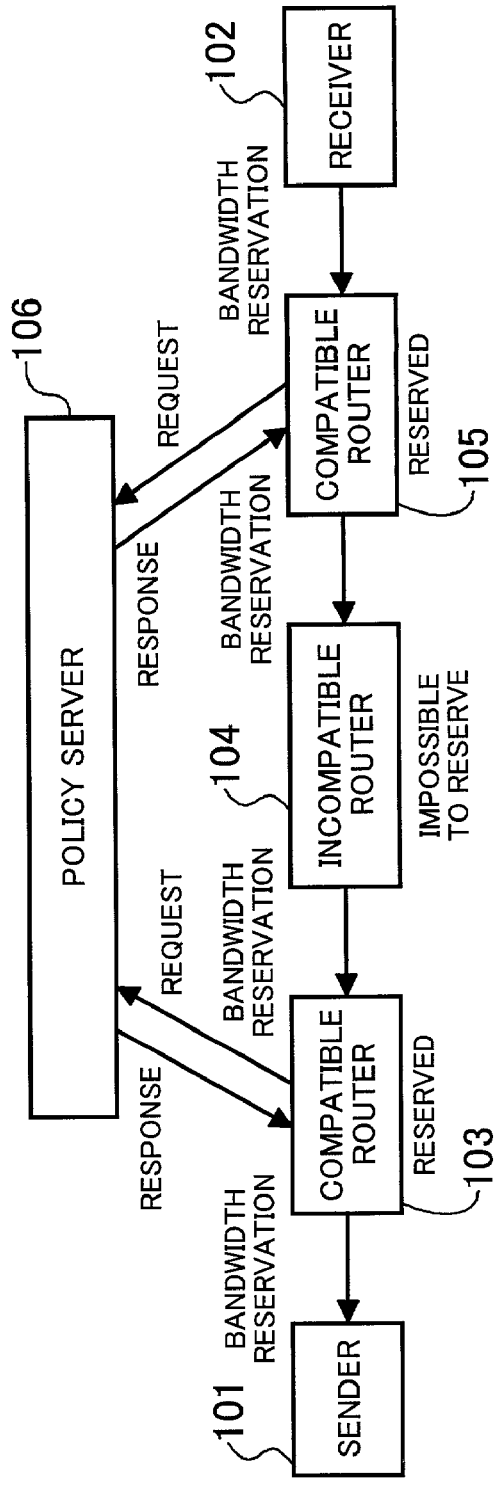
FIG. 20(A) PRIOR ART
FIG. 20(B) PRIOR ART

SERVICE ASSIGNMENT APPARATUS

BACKGROUND OF THE INVENTION

1) Field of the Invention

The present invention relates to a service assignment apparatus. In particular, the present invention relates to a service assignment apparatus which assigns an appropriate service to one of a plurality of network elements constituting a network and having various functions, when the network element cannot provide a service corresponding to a service request, so that the corresponding service can be guaranteed in the entire network.

2) Description of the Related Art

Recently, various services are provided by a network, and some service are provided by processing a service request from an external device. However, networks often include a network element which cannot process a specific service request, and cannot therefore provide a corresponding service even though the network element has a service providing function. Nevertheless, it is not realistic to adapt all network elements constituting a network for such a specific service, and it is desirable to effectively use limited network resources.

The quality of service (QoS) control for guaranteeing a bandwidth and the class of service (CoS) control for prioritizing traffic are known as service controls provided by a specific network element.

The QoS control dynamically guarantees end-to-end service quality so as to prevent interruption or delay of image data or voice data, for example, in a video conference. The Resource Reservation Protocol (RSVP) is a protocol which is standardized by the IETF (Internet Engineering Task Force) for realizing the QoS control and dynamically guaranteeing a bandwidth. On the other hand, the CoS control for prioritizing traffic is a static service provided in accordance with a predetermined priority.

Operations in the case where network elements respectively providing different services exist between opposite ends are explained below.

FIGS. 19(A), 19(B), and 19(C) are diagrams illustrating operations of conventional network elements in exemplary cases where a service requester attempts to receive a bandwidth reservation service by using the RSVP protocol. FIG. 19(A) exhibits the first stage, FIG. 19(B) exhibits the second stage, and FIG. 19(C) exhibits the third stage. In FIGS. 19(A), 19(B), and 19(C), it is assumed that the sender 101 and the receiver 102 are a server and a client in a client-server system, respectively. The receiver 102 is connected to the sender 101 through a communication path established in a network, and an RSVP-compatible router 103, an RSVP-incompatible router 104 which is not yet compatible with RSVP, and an RSVP-compatible router 105 are located on the communication path. In this example, the service provided by the network constituted by the RSVP-compatible router 103, the RSVP-incompatible router 104, and the RSVP-compatible router 105 is reservation of a bandwidth.

In the first stage illustrated in FIG. 19(A), a path-designation message (Path message) is transmitted from the sender 101 to the receiver 102. The path-designation message is transferred through the RSVP-compatible router 103, the RSVP-incompatible router 104, and the RSVP-compatible router 105 to the receiver 102. When the path-designation message is transferred through each of the RSVP-compatible routers 103 and 105, each of the RSVP-compatible routers 103 and 105 stores path information.

Next, in the second stage illustrated in FIG. 19(B), in order to request a bandwidth reservation, the receiver 102 sends a bandwidth-reservation request message (Resv message) through the path to the sender 101. Each of the RSVP-compatible routers 103 and 105 makes a self-decision in response to the bandwidth-reservation request, and performs processing for the bandwidth reservation. Since the RSVP-incompatible router 104 cannot perform processing for bandwidth reservation, the RSVP-incompatible router 104 does not process the bandwidth-reservation request, and merely transfers the bandwidth-reservation request message to the next RSVP-compatible router 103.

In the third stage illustrated in FIG. 19(C), the sender 101 transmits data to the receiver 102. Since the bandwidth is reserved by the RSVP-compatible routers 103 and 105, the RSVP-compatible routers 103 and 105 can guarantee the bandwidth. However, the bandwidth is not reserved by the RSVP-incompatible router 104. Therefore, a problem can occur in the data transmitted from the sender 101 to the receiver 102. For example, a portion of the data may be lost before the receiver 102 receives the data.

As described above, when a network element which cannot process a service request exists on a communication path, the network element cannot recognize the service request, i.e., the network element ignores the service request. Therefore, the network element cannot provide the requested service. Resultantly, sometimes the network cannot provide the requested service.

FIGS. 20(A), 20(B), and 20(C) are diagrams illustrating operations of other conventional network elements. FIG. 20(A) exhibits the first stage, FIG. 20(B) exhibits the second stage, and FIG. 20(C) exhibits the third stage. In this example, each router does not make a self-decision as to whether or not the router should reserve a bandwidth in response to the bandwidth-reservation request, and instead a policy server 106 makes a decision as to whether or not each router should reserve a bandwidth for the bandwidth-reservation request, where the policy server 106 is provided for performing policy control operations in the network. In this example, the service provided by the network constituted by the RSVP-compatible router 103, the RSVP-incompatible router 104, and the RSVP-compatible router 105 is also bandwidth reservation.

In the first stage illustrated in FIG. 20(A), a path-designation message (Path message) is transmitted from the sender 101 to the receiver 102. The path-designation message is transferred through the RSVP-compatible router 103, the RSVP-incompatible router 104, and the RSVP-compatible router 105 to the receiver 102. When the path-designation message is transferred through each of the RSVP-compatible routers 103 and 105, each of the RSVP-compatible routers 103 and 105 stores path information.

Next, in the second stage illustrated in FIG. 20(B), in order to request a bandwidth reservation, the receiver 102 sends a bandwidth-reservation request message through the path to the sender 101. When each of the RSVP-compatible routers 103 and 105 receives the bandwidth-reservation request, the RSVP-compatible router requests permission for a bandwidth reservation from the policy server 106 in accordance with the Common Open Policy Service (COPS) protocol, which is a protocol proposed in the RSVP admission policy work group (RAP-WG) in the IETF, and used for performing admission control operations (which determines permission for or rejection of a reservation), where the admission control is performed during a bandwidth reservation process, for example, in accordance with RSVP.

The policy server 106 makes a decision as to whether to permit the bandwidth reservation or not, based on a policy which the policy server 106 has, and returns a decision result to the RSVP-compatible router 103 or 105 which requests the permission for a reservation. When each of the RSVP-compatible routers 103 and 105 is permitted to reserve the bandwidth, each of the RSVP-compatible routers 103 and 105 makes a reservation of the bandwidth. However, the RSVP-incompatible router 104 cannot perform processing for reserving a bandwidth. Therefore, the RSVP-incompatible router 104 does not process the bandwidth-reservation request, and merely transfers the bandwidth-reservation request message to the next RSVP-compatible router 103.

In the third stage illustrated in FIG. 20(C), the sender 101 transmits data to the receiver 102. Since the bandwidth is reserved by the RSVP-compatible routers 103 and 105, the RSVP-compatible routers 103 and 105 can guarantee the bandwidth. However, the bandwidth is not reserved by the RSVP-incompatible router 104. Therefore, even when the policy server 106 is provided in the network, the policy server 106 only makes a decision as to whether to permit the bandwidth reservation or not, and the policy server 106 does nothing for the RSVP-incompatible router 104. That is, the network cannot provide a bandwidth reservation service for the communication path from the sender 101 to the receiver 102.

SUMMARY OF THE INVENTION

An object of the present invention is to provide a service assignment apparatus which sets an appropriate service in a service-incompatible network element so that the network as a whole can guarantee a service corresponding to a service request, even when the service-incompatible apparatus cannot inherently provide the service corresponding to the service request.

In order to accomplish the above object, according to the present invention, there is provided a service assignment apparatus for obtaining information on a network-service-provision state of a service-request-compatible apparatus, and setting a network service in a service-request-incompatible apparatus, where the service-request-compatible apparatus can receive a network-service request, and provide a requested network service, and the service-request-incompatible apparatus can undergo an operation, performed by an external apparatus, of setting a network service in the service-request-incompatible apparatus, and provide the network service set by the external apparatus. The service assignment apparatus comprises: a network-information collecting means which collects the information on the network-service-provision state of the service-request-compatible apparatus; a target-apparatus determining means which determines a service-request-incompatible apparatus which cannot provide a network service provided by the service-request-compatible apparatus, based on the information on the network-service-provision state which is collected by the network-information collecting means; a service mapping means which determines a service which is to be set in the service-request-incompatible apparatus, based on the information on the network-service-provision state which is collected by the network-information collecting means and information on the service-request-incompatible apparatus determined by the target-apparatus determining means; and a service setting means which sets the service determined by the service mapping means, in the service-request-incompatible apparatus.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

In the drawings:

FIG. 6 is a diagram illustrating an example of a bandwidth-reservation-decision-policy table.

FIG. 7 is a diagram illustrating an example of a path information table.

FIG. 8 is a diagram illustrating an example of a service mapping table.

FIG. 14 is a diagram illustrating an example of a dynamic network information table.

FIGS. 20(A), 20(B), and 20(C) are diagrams illustrating operations of other conventional network elements, where FIG. 20(A) exhibits the first stage, FIG. 20(B) exhibits the second stage, and FIG. 20(C) exhibits the third stage.

DESCRIPTION OF THE PREFERRED EMBODIMENTS

Embodiments of the present invention are explained in detail below with reference to drawings.

Figure 1:
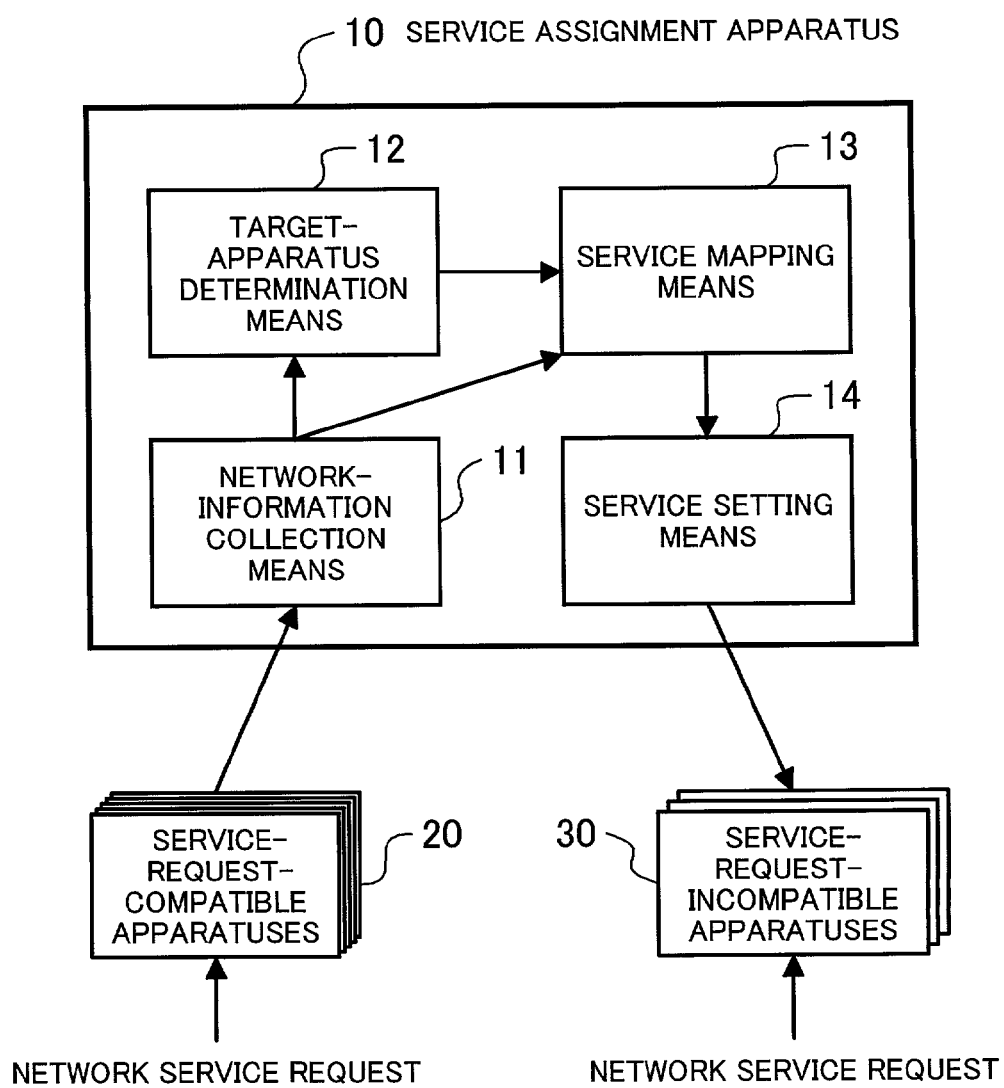
FIG. 1 is a block diagram illustrating a basic construction of a service assignment apparatus according to the present invention.

FIG. 1 is a block diagram illustrating a basic construction of a service assignment apparatus according to the present invention. The service assignment apparatus 10 is connected to at least one service-request-compatible apparatus 20 and at least one service-request-incompatible apparatus 30, which are network elements. The service assignment apparatus 10 comprises a network-information collection means 11, a target-apparatus determination means 12, a service mapping means 13, and a service setting means 14.

Each service-request-compatible apparatus 20 has a function of receiving a network-service request, and providing a network service. In addition, each service-request-compatible apparatus 20 also has a function of supplying information on a service-provision state to the service assignment apparatus 10. Each service-request-incompatible apparatus 30 receives a network-service request, and does not process the network-service request. However, each service-request-incompatible apparatus 30 has a function of receiving a service setting request, and performing an operation of setting a service in the service-request-incompatible apparatus 30. Each service-request-incompatible apparatus 30 also has a function of providing the service which is set in the service-request-incompatible apparatus 30.

In the service assignment apparatus 10, the network-information collection means 11 has a function of collecting the information on the service-provision state from each service-request-compatible apparatus 20. The target-apparatus determination means 12 has a function of determining, based on the information on the service-provision state which is collected by the network-information collection means 11, one of the at least one service-request-incompatible apparatus 30 in which an operation of setting a service should be performed. The service mapping means 13 has a function of linking the network information with the service setting operation. To be specific, the service mapping means 13 performs a service mapping operation based on the information on the service-provision state which is collected by the network-information collection means 11 and the data on the service-request-incompatible apparatus 30 determined by the target-apparatus determination means 12. In the mapping operation, the service mapping means 13 determines a service setting item, and makes the conversion into a set value. The service setting means 14 has a function of setting service-setting information supplied by the service mapping means 13, in the service-request-incompatible apparatus 30 determined by the target-apparatus determination means 12.

In the above construction, first, one of the at least one service-request-compatible apparatus 20 receives and processes a network-service request, and provides a network service corresponding to the network-service request. The network-information collection means 11 collects the information on the service-provision state from the service-request-compatible apparatus 20, and supplies the information on the service-provision state to the target-apparatus determination means 12 and the service mapping means 13.

The target-apparatus determination means 12 determines one of the at least one service-request-incompatible apparatus 30 based on the information on the service-provision state which is received from the network-information collection means 11, and informs the service mapping means 13 of a result of the determination. The service mapping means 13 determines a service which should be set in the one of the at least one service-request-incompatible apparatus 30 based on the information on the service-provision state which is received from the network-information collection means 11 and the result of the determination received from the target-apparatus determination means 12, and supplies the data of the determined service to the service setting means 14. The service setting means 14 sets the data received from the service mapping means 13, in the one of the at least one service-request-incompatible apparatus 30.

Thus, it is possible to make the service-request-incompatible apparatus 30 provide a service which is identical to or corresponds to a service provided by the service-request-compatible apparatus 20, even when the service-request-incompatible apparatus 30 cannot inherently provide the service due to incapability of processing a network-service request for the service. That is, it is possible to assign a characteristic service of the service-request-compatible apparatuses 20 to the service-request-incompatible apparatus 30, and therefore the service-request-incompatible apparatus 30 can provide the service.

The service assignment apparatus 10 further comprises a service-provision-permission decision means which makes a decision as to whether to permit provision of a requested service or not, when a service-request-compatible apparatus 20 receives a network-service request.

When a service-request-compatible apparatus 20 receives a network-service request, the service-request-compatible apparatus 20 requests the service assignment apparatus 10 to make a decision as to whether to permit provision of a service or not. The service assignment apparatus 10 receives the request for the decision, and makes the decision based on reference data stored in the service assignment apparatus 10. When the service-provision-permission decision means supplies a result of the decision to the service-request-compatible apparatus 20, the service-request-compatible apparatus 20 provides or does not provide the service according to the result of the decision.

The target-apparatus determination means 12 recognizes the information on the service-provision state based on the request for the decision as to whether to permit provision of the service or not, which the service-provision-permission decision means receives. Then, the target-apparatus determination means 12 determines one of the at least one of the service-request-incompatible apparatus 30 in which an operation of setting a service should be performed, and a result of the determination is supplied to the service mapping means 13. The service mapping means 13 determines a service which should be set in the one of the at least one service-request-incompatible apparatus 30, based on the information on the service-provision state which is received from the service-provision-permission decision means and the result of the determination received from the target-apparatus determination means 12, and supplies the data of the determined service, to the service setting means 14. The service setting means 14 sets the data received from the service mapping means 13, in the one of the at least one service-request-incompatible apparatus 30. Since the service assignment apparatus 10 comprises the service-provision-permission decision means, the service assignment apparatus 10 can respond to a request for decision as to whether to permit provision of a service or not.

Further, the network-information collection means 11 in the service assignment apparatus 10 comprises a network state monitor means which can recognize settings in and states of the at least one service-request-compatible apparatus 20 and the at least one service-request-incompatible apparatus 30. Thereby, the service-provision-permission decision means in the service assignment apparatus 10 makes a decision as to whether to permit provision of a service, in response to a received request for the decision, based on the state of the network which is recognized by the network state monitor means. If the service assignment apparatus 10 does not recognize the state of the network, it is probable that the service-provision-permission decision means permits provision of a service in response to a request for decision as to whether to permit the provision of the service or not, even when the network is in a state which does not allow the provision of the service. However, since the information on the state of the network is used when making the decision, the service assignment apparatus 10 can make an appropriate decision as to whether to permit the provision of the service, in consideration of the state of the network, and inform the service-request-compatible apparatus 20 of the result of the appropriate decision.

Furthermore, the target-apparatus determination means 12 can be configured so as to receive information on the state of each network, which is collected by the network-information collection means 11, and determine one of the at least one service-request-incompatible apparatus 30 based on the received information on the state of each network. Therefore, even when the location of the at least one service-request-incompatible apparatus 30 dynamically changes according to the state of the network, the target-apparatus determination means 12 can use the information on the state of each network when determining the one of the at least one service-request-incompatible apparatus 30. That is, the target-apparatus determination means 12 can determine the location of the one of the at least one service-request-incompatible apparatus 30 in consideration of the change of the location of the at least one service-request-incompatible apparatus 30.

Hereinbelow, the embodiments of the present invention are explained. In the following embodiments, the present invention is applied to policy servers. Generally, various services including, for example, the bandwidth reservation service relating to quality of communication, the access authentication service relating to security, the resource delivery service relating to transfer of program and data, are provided by networks. However, the following explanations are provided for the case of the bandwidth reservation service as an example. In the bandwidth reservation service, a service requester requests a bandwidth reservation for end-to-end communication by using the RSVP protocol, and the network makes the bandwidth reservation for the requested communication.

Figure 2:
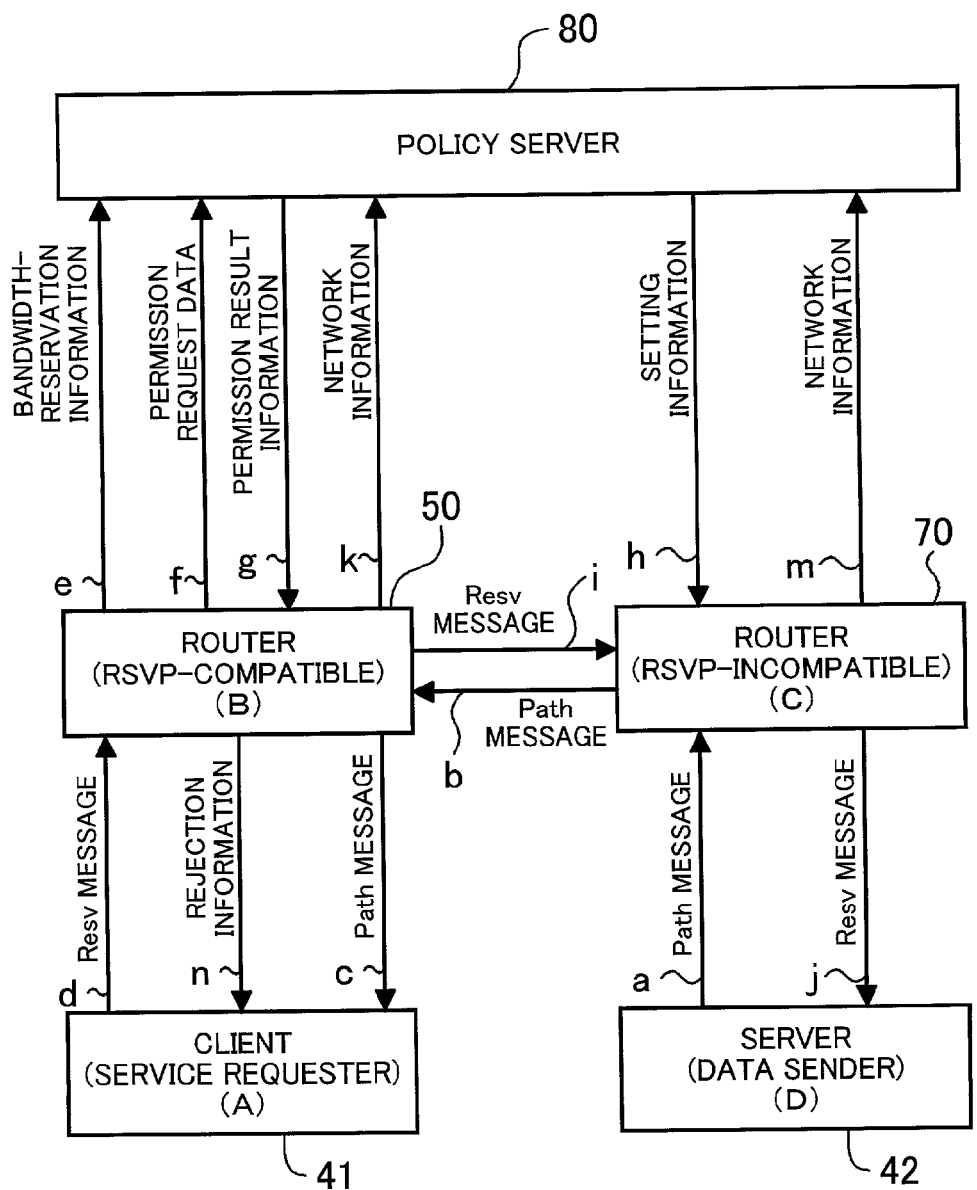
FIG. 2 is a diagram illustrating an arrangement of network elements.

FIG. 2 is a diagram illustrating an arrangement of network elements. In FIG. 2, a client 41 and a server 42 are connected through a network, which is a data transmission medium comprising two routers 50 and 70. A policy server 80 is connected to the two routers 50 and 70. The client 41 is a service requester, and the server 42 is a data sender. The router 50 is an RSVP-compatible router which can receive an RSVP-resource-reservation request, and provide a resource reservation service, and the router 70 is an RSVP-incompatible router which can provide a service in accordance with control information which is externally set in the router 70. The policy server 80 functions as a service assignment apparatus which assigns appropriate setting information in the router 70 based on bandwidth reservation information in the router 50. For the sake of simplicity, hereinafter, the client 41 may be referred to as an apparatus A, the router 50 may be referred to as an apparatus B, the router 70 may be referred to as an apparatus C, and the server 42 may be referred to as an apparatus D. Details of signals exchanged between the apparatuses are explained below for the respective embodiments.

The first embodiment is explained below. First, the constructions of the respective apparatuses are explained.

Figure 3:
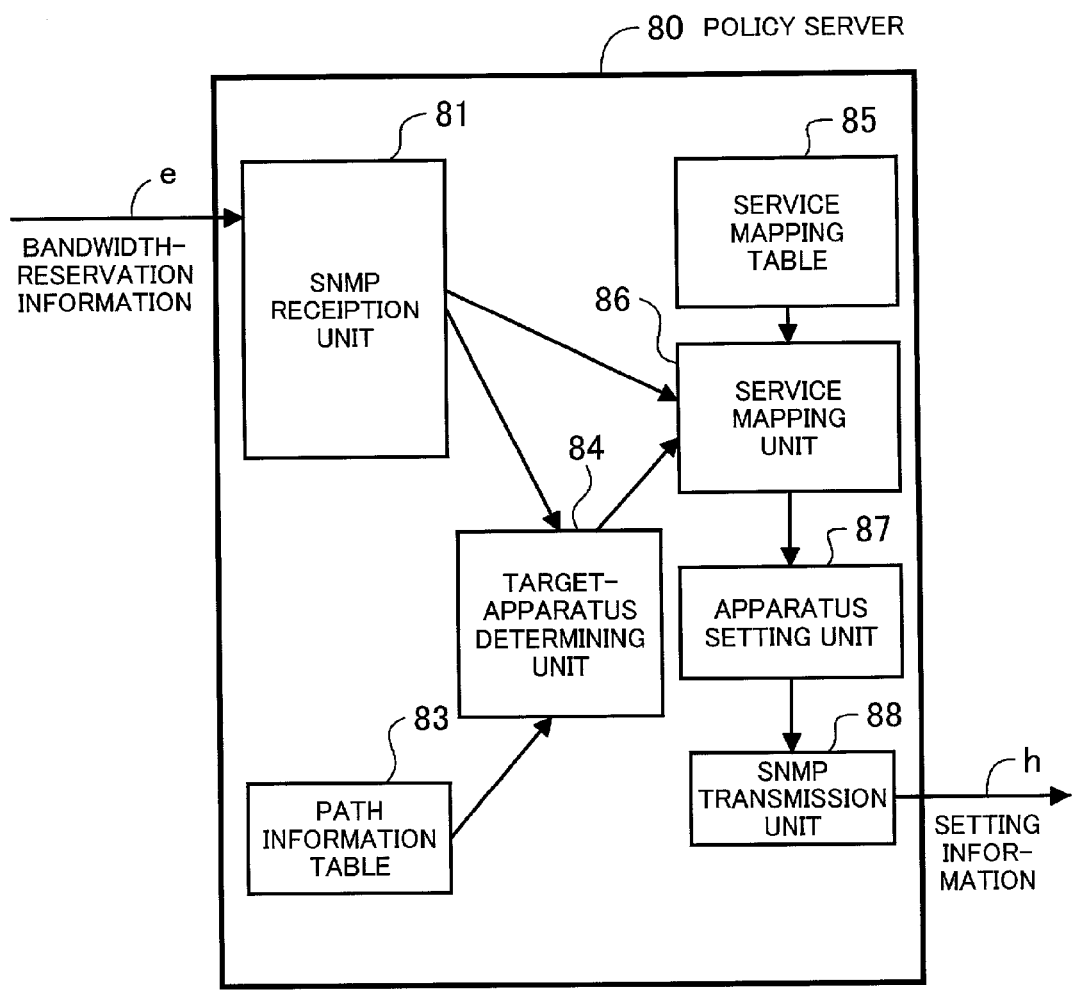
FIG. 3 is a block diagram illustrating an exemplary construction of a policy server in the first embodiment.
Figure 4:
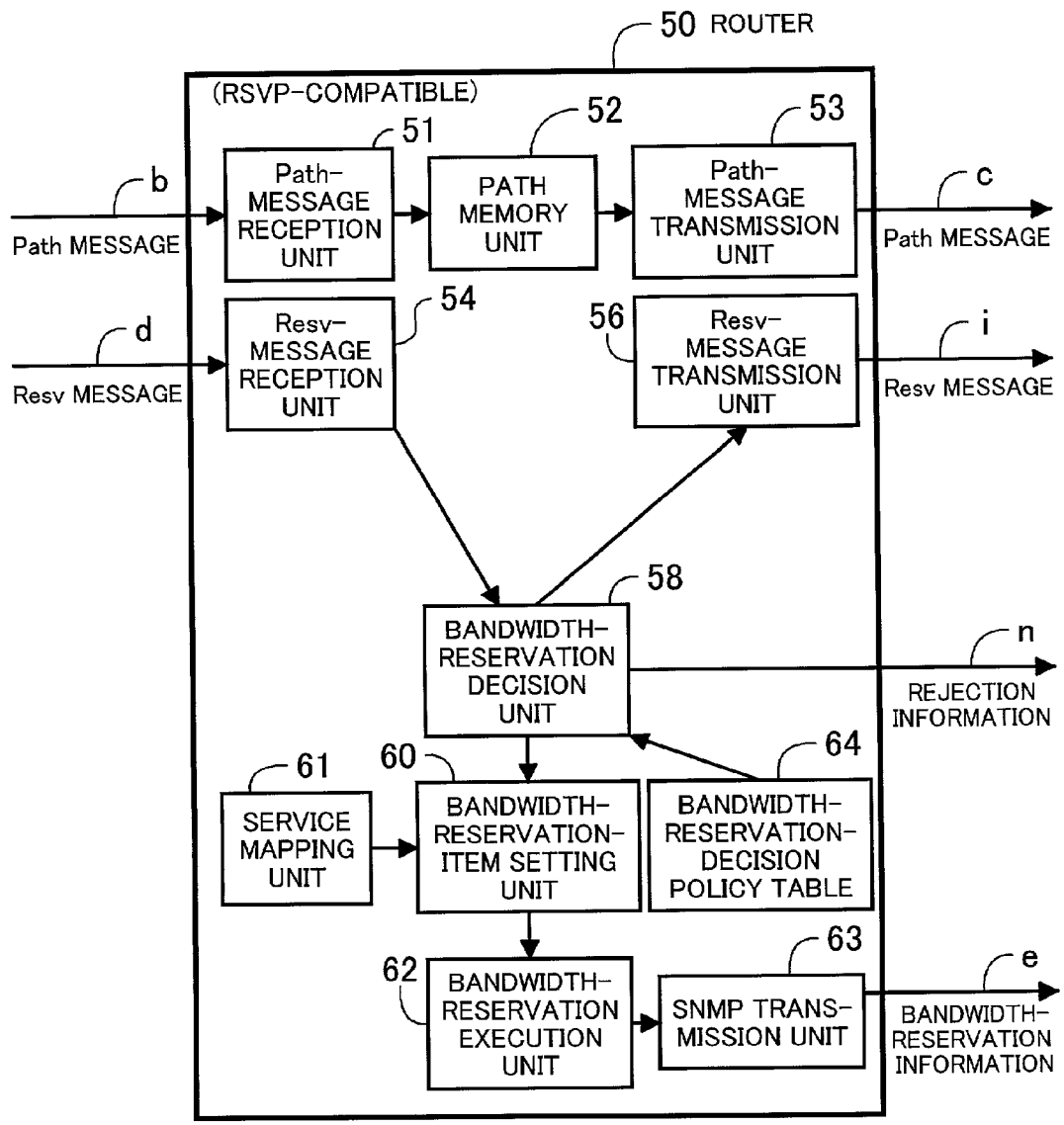
FIG. 4 is a block diagram illustrating an exemplary construction of an RSVP-compatible router in the first embodiment.
Figure 5:
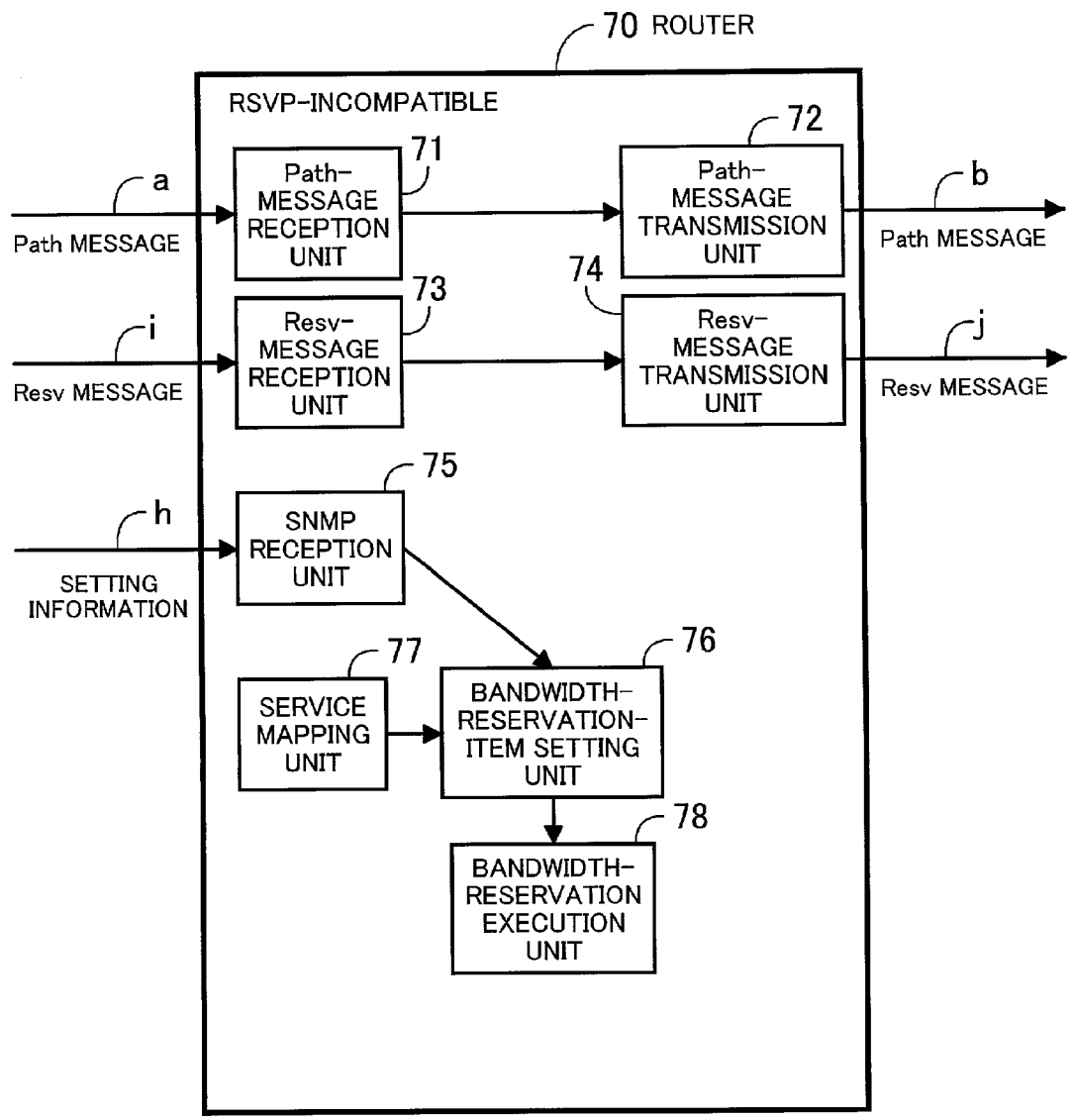
FIG. 5 is a block diagram illustrating an exemplary construction of an RSVP-incompatible router in the first embodiment.

FIGS. 3, 4, and 5 are block diagrams respectively illustrating exemplary constructions of a policy server, an RSVP-compatible router, and an RSVP-incompatible router in the first embodiment.

As illustrated in FIG. 3, the policy server 80 comprises an SNMP reception unit 81, a path information table 83, a target-apparatus determining unit 84, a service mapping table 85, a service mapping unit 86, an apparatus setting unit 87, and an SNMP transmission unit 88. The SNMP reception unit 81 receives bandwidth-reservation information e from the RSVP-compatible router 50, and the SNMP transmission unit 88 sends setting information h to the RSVP-incompatible router 70.

As illustrated in FIG. 4, the RSVP-compatible router 50 comprises a Path-message reception unit 51, a path memory unit 52, a Path-message transmission unit 53, a Resv-message reception unit 54, a Resv-message transmission unit 56, a bandwidth-reservation decision unit 58, a bandwidth-reservation-item setting unit 60, a service mapping unit 61, a bandwidth-reservation execution unit 62, an SNMP transmission unit 63, and a bandwidth-reservation-decision policy table 64. The Path-message reception unit 51 receives a Path message b from the RSVP-incompatible router 70, the Path-message transmission unit 53 sends a Path message c to the client 41, the Resv-message reception unit 54 receives a Resv message d from the client 41, and the Resv-message transmission unit 56 sends a Resv message i to the RSVP-incompatible router 70. When the bandwidth-reservation decision unit 58 decides not to permit a bandwidth reservation, the bandwidth-reservation decision unit 58 sends rejection information n to the client 41. When the bandwidth-reservation decision unit 58 decides to permit a bandwidth reservation, the SNMP transmission unit 63 sends bandwidth-reservation information e to the policy server 80.

As illustrated in FIG. 5, the RSVP-incompatible router 70 comprises a Path-message reception unit 71, a Path-message transmission unit 72, a Resv-message reception unit 73, a Resv-message transmission unit 74, an SNMP reception unit 75, a bandwidth-reservation-item setting unit 76, a service mapping unit 77, and a bandwidth-reservation execution unit 78. The Path-message reception unit 71 receives a Path message a from the server 42, the Path-message transmission unit 72 sends a Path message b to the RSVP-compatible router 50, the Resv-message reception unit 73 receives a Resv message i from the RSVP-compatible router 50, the Resv-message transmission unit 74 sends a Resv message j to the server 42, and the SNMP reception unit 75 receives the setting information h from the policy server 80.

Next, the operations of the network elements having the above constructions are explained below.

First, the server 42 as a data sender sends a Path message a to the RSVP-incompatible router 70 in accordance with the RSVP protocol. When the Path-message reception unit 71 in the RSVP-incompatible router 70 receives the Path message a, the RSVP-incompatible router 70 cannot process the Path message a in accordance with the RSVP protocol. Therefore, the Path-message transmission unit 72 sends the Path message a as a Path message b to the RSVP-compatible router 50 in accordance with the RSVP protocol.

When the Path-message reception unit 51 in the RSVP-compatible router 50 receives the Path message b, the RSVP-compatible router 50 obtains from the Path message b information on the path of the Path message b from its source to the RSVP-compatible router 50, and stores the information on the path in the path memory unit 52. Thereafter, the Path-message transmission unit 53 sends a Path message c to the client 41 in accordance with the RSVP protocol.

The client 41 sends a Resv message d to the RSVP-compatible router 50 in accordance with the RSVP protocol in order to request a bandwidth reservation service. In an example of the request for the bandwidth reservation, the user name is "Kurose," and the bandwidth is "5 Mbps."

When the Resv-message reception unit 54 in the RSVP-compatible router 50 receives the Resv message d in accordance with the RSVP protocol, the bandwidth-reservation decision unit 58 makes a decision on the bandwidth reservation. In this case, the bandwidth-reservation-decision policy table 64 is used. An example of the bandwidth-reservation-decision-policy table 64 is illustrated in FIG. 6.

FIG. 6 is a diagram illustrating an example of the bandwidth-reservation-decision-policy table, which contains fields for indicating at least a user name and a maximum amount of a bandwidth which can be reserved. That is, the bandwidth-reservation-decision-policy table defines a maximum amount of a bandwidth which can be reserved for each user. The bandwidth-reservation decision unit 58 refers to the bandwidth-reservation-decision-policy table when the bandwidth-reservation decision unit 58 makes a decision as to whether to permit a reservation of a requested bandwidth or not.

The bandwidth-reservation decision unit 58 makes the decision on the bandwidth reservation based on the bandwidth-reservation-decision policy table 64 and the Resv message d received by the Resv-message reception unit 54. Since the bandwidth-reservation-decision policy in the bandwidth-reservation-decision policy table 64 indicates that the maximum amount of a bandwidth which can be reserved for the user name "Kurose" is "5 Mbps," the bandwidth reservation parameter in the Resv message in accordance with the RSVP protocol does not exceed the limit. Therefore, the bandwidth-reservation decision unit 58 permits the bandwidth reservation.

When the bandwidth reservation is permitted, the Resv-message transmission unit 56 sends a Resv message i to the RSVP-incompatible router 70 in accordance with the RSVP protocol. When the bandwidth reservation is not permitted, the bandwidth-reservation decision unit 58 sends rejection information n to the client 41. Since, in this example, the bandwidth-reservation decision unit 58 permits the bandwidth reservation, the bandwidth-reservation-item setting unit 60 sets a bandwidth-reservation item. That is, the bandwidth-reservation-item setting unit 60 sets a value of an item corresponding to the bandwidth-reservation parameter by using the service mapping unit 61. Then, the bandwidth-reservation execution unit 62 assigns a bandwidth of "5 Mbps" as a reserved bandwidth for the communication with the user name "Kurose." In addition, after the bandwidth is reserved, the bandwidth-reservation execution unit 62 supplies bandwidth-reservation information on the reservation to the SNMP transmission unit 63. The SNMP transmission unit 63 sends the bandwidth-reservation information e to the policy server 80.

The Resv-message reception unit 73 in the RSVP-incompatible router 70 receives a Resv message i in accordance with the RSVP protocol. However, since the RSVP-incompatible router 70 cannot process the Resv message i, the RSVP-incompatible router 70 sends the Resv message i as a Resv message j to the server 42 in accordance with the RSVP protocol.

On the other hand, the SNMP reception unit 81 in the policy server 80 receives the bandwidth-reservation information e. Thus, the policy server 80 obtains the bandwidth-reservation information, and recognizes that reservation is made in the RSVP-compatible router 50. The bandwidth-reservation information is then transferred to the target-apparatus determining unit 84 and the service mapping unit 86. The target-apparatus determining unit 84 determines the location of the RSVP-incompatible router 70 based on path information included in the bandwidth-reservation information and network information which is set in the path information table 83. An example of the path information table 83 is illustrated in FIG. 7.

FIG. 7 is a diagram illustrating an example of the path information table. The path information table contains fields for indicating the name of each apparatus and the next apparatus on each path. That is, a network element located next to each network element on each path is predefined. Information indicating the location of each apparatus, for example, an IP (internet protocol) address of each apparatus, is used as the name of each apparatus.

The target-apparatus determining unit 84 determines the location of the RSVP-incompatible router 70 based on the bandwidth-reservation information and the path information table 83. In this case, according to the path information table 83, which is provided in advance as illustrated in FIG. 7, the RSVP-incompatible router 70 is located next to the RSVP-compatible router 50. Therefore, the RSVP-incompatible router 70 is determined to be a target apparatus. The target-apparatus determination information is supplied to the service mapping unit 86, which determines a value to be set in the RSVP-incompatible router 70, by using the service mapping table 85 based on the bandwidth-reservation information obtained from the SNMP reception unit 81. An example of the service mapping table 85 is illustrated in FIG. 8.

FIG. 8 is a diagram illustrating an example of the service mapping table. The service mapping table contains fields for indicating a user name, an amount of bandwidth reservation, and priority assignment. The service mapping table is a conversion table defining a service having a priority which is regarded as appropriate for a bandwidth reservation service requested by each user.

Since the bandwidth-reservation information on the RSVP-compatible router 50, which is received by the SNMP reception unit 81, includes the user name "Kurose" and the reserved bandwidth of "5 Mbps," the service mapping unit 86 can recognize that the priority assignment corresponding to the user name and the reserved bandwidth is "3" by referring to the service mapping table 85. Therefore, the service mapping unit 86 assigns the priority "3" to the user name "Kurose," and the apparatus setting unit 87 determines the priority assignment of "3" to the RSVP-incompatible router 70. Information on the priority assignment is supplied to the SNMP transmission unit 88, and is then sent to the RSVP-incompatible router 70 as setting information h.

The RSVP-incompatible router 70 receives the setting information h through the SNMP reception unit 75, and the bandwidth-reservation-item setting unit 76 performs an operation of setting a bandwidth-reservation item. At this time, the service mapping unit 77 determines the bandwidth-reservation item corresponding to the priority assignment "3," and the bandwidth-reservation execution unit 78 executes the bandwidth reservation in accordance with the determined bandwidth-reservation item.

As explained above, in the first embodiment, when the RSVP-compatible router 50 receives a service request for a bandwidth reservation, the router 50 makes a decision as to whether to grant the service request or not, by itself, based on the bandwidth-reservation-decision policy table 64, executes the bandwidth reservation, and sends the bandwidth-reservation information to the policy server 80. The policy server 80 statically determines the router 70 as a service-incompatible router on the path, based on the supplied bandwidth-reservation information and the path information table which is set in advance. Then, the policy server 80 sets in the service-incompatible router 70 a service corresponding to the bandwidth reservation service in the router 50. As a result, it is possible to dynamically set an appropriate service in a router which is not yet compatible with the RSVP protocol. Therefore, it is possible to effectively utilize RSVP-incompatible network resources in a network environment in which RSVP-compatible routers and RSVP-incompatible routers are mixed.

The second embodiment is explained below. First, the constructions of the respective apparatuses used in the second embodiment are explained. Since the RSVP-incompatible router 70 in the second embodiment is identical with the RSVP-incompatible router 70 in the first embodiment, only the policy server 80 and the RSVP-compatible router 50 in the second embodiment are explained below.

Figure 9:
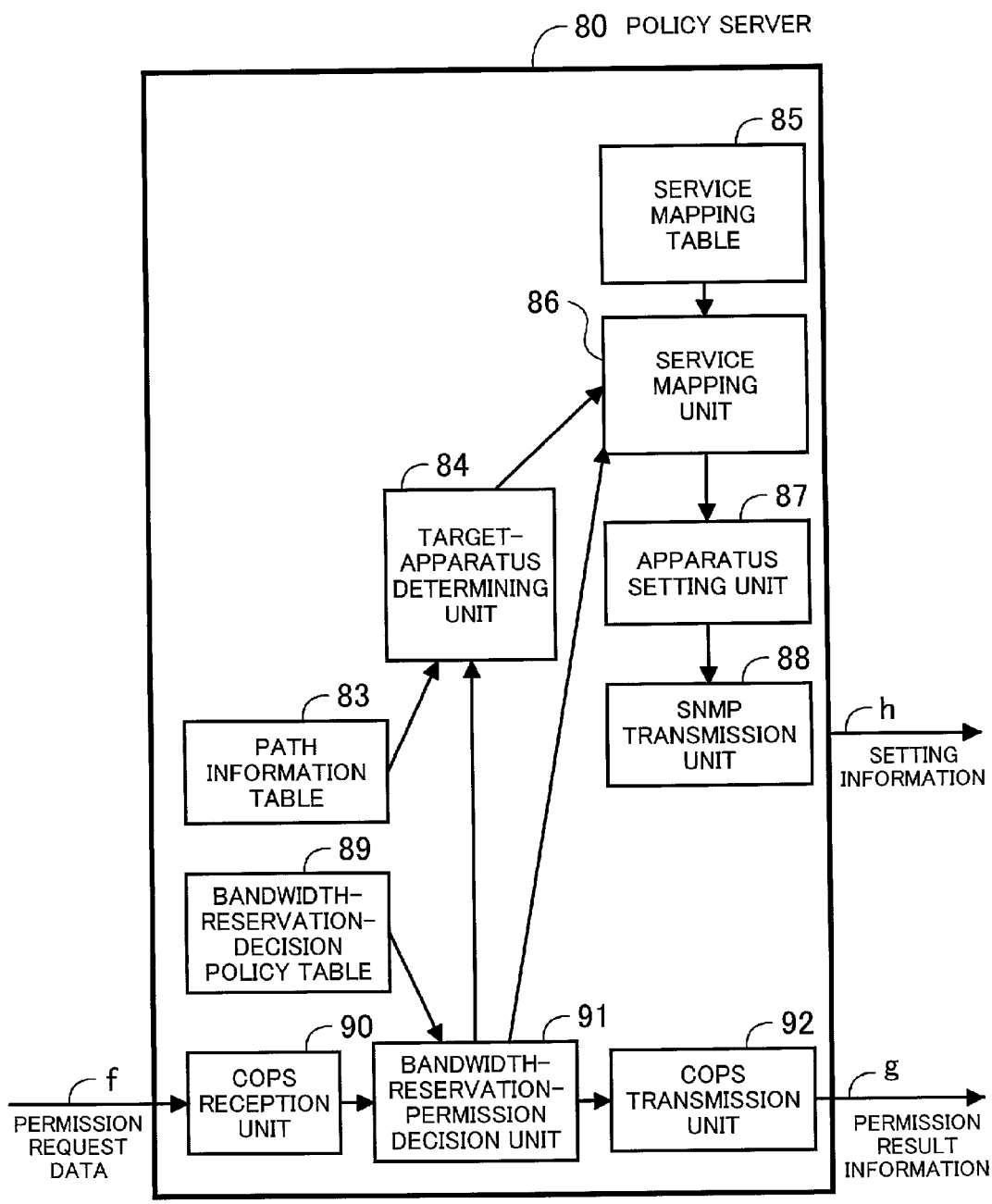
FIG. 9 is a block diagram illustrating an exemplary construction of a policy server in the second embodiment.
Figure 10:
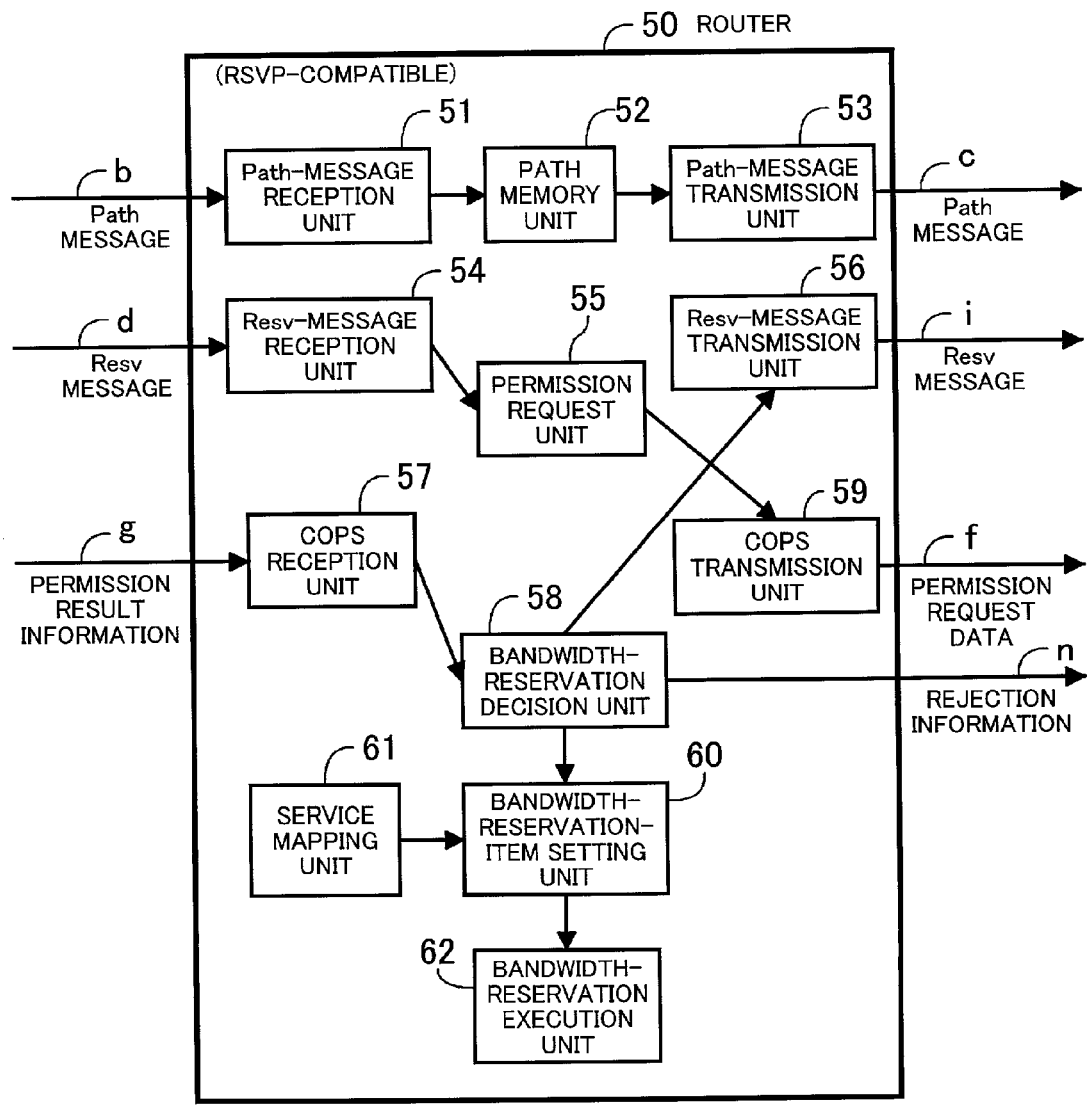
FIG. 10 is a block diagram illustrating an exemplary construction of an RSVP-compatible router in the second embodiment.

FIGS. 9 and 10 are block diagrams respectively illustrating exemplary constructions of a policy server and an RSVP-compatible router in the second embodiment.

As illustrated in FIG. 9, the policy server 80 comprises a path information table 83, a target-apparatus determining unit 84, a service mapping table 85, a service mapping unit 86, an apparatus setting unit 87, an SNMP transmission unit 88, a bandwidth-reservation-decision policy table 89, a COPS reception unit 90, a bandwidth-reservation-permission decision unit 91, and a COPS transmission unit 92. The SNMP transmission unit 88 sends setting information h to the RSVP-incompatible router 70. The COPS reception unit 90 receives permission request data f from the RSVP-compatible router 50. The COPS transmission unit 92 sends permission result information g to the RSVP-compatible router 50.

As illustrated in FIG. 10, the RSVP-compatible router 50 comprises a Path-message reception unit 51, a path memory unit 52, a Path-message transmission unit 53, a Resv-message reception unit 54, a permission request unit 55, a Resv-message transmission unit 56, a COPS reception unit 57, a bandwidth-reservation decision unit 58, a COPS transmission unit 59, a bandwidth-reservation-item setting unit 60, a service mapping unit 61, and a bandwidth-reservation execution unit 62. The Path-message reception unit 51 receives a Path message b from the RSVP-incompatible router 70, the Path-message transmission unit 53 sends a Path message c to the client 41, the Resv-message reception unit 54 receives a Resv message d from the client 41, and the Resv-message transmission unit 56 sends a Resv message i to the RSVP-incompatible router 70. When the bandwidth-reservation decision unit 58 decides not to permit a bandwidth reservation, the bandwidth-reservation decision unit 58 sends rejection information n to the client 41. The COPS reception unit 57 receives the permission result information g from the policy server 80. The COPS transmission unit 59 sends the permission request data f to the policy server 80.

Next, the operations of the network elements illustrated in FIGS. 9, 10, and 5 are explained below.

First, the server 42 sends a Path message a to the RSVP-incompatible router 70 in accordance with the RSVP protocol. When the Path-message reception unit 71 in the RSVP-incompatible router 70 receives the Path message a, the RSVP-incompatible router 70 does not process the Path message a in accordance with the RSVP protocol, and the Path-message transmission unit 72 sends the Path message a as a Path message b to the RSVP-compatible router 50 in accordance with the RSVP protocol.

When the Path-message reception unit 51 in the RSVP-compatible router 50 receives the Path message b, the RSVP-compatible router 50 obtains from the Path message b information on the path of the Path message b from its source to the RSVP-compatible router 50, and stores the information on the path in the path memory unit 52. Thereafter, the Path-message transmission unit 53 sends a Path message c to the client 41 in accordance with the RSVP protocol.

The client 41 sends a Resv message d to the RSVP-compatible router 50 in accordance with the RSVP protocol in order to request a bandwidth reservation service. In an example of the request for the bandwidth reservation, the user name is "Kurose," and the bandwidth is "5 Mbps."

When the Resv-message reception unit 54 in the RSVP-compatible router 50 receives the Resv message d in accordance with the RSVP protocol, the Resv message d is transferred to the permission request unit 55. The permission request unit 55 supplies to the COPS transmission unit 59 permission request data f which requests a decision as to whether to permit the bandwidth reservation or not, and the COPS transmission unit 59 sends the permission request data f to the policy server 80.

The COPS reception unit 90 in the policy server 80 receives the permission request data f, and transfers the permission request data f to the bandwidth-reservation-permission decision unit 91. The bandwidth-reservation-permission decision unit 91 makes a decision as to whether to permit the bandwidth reservation or not, based on the bandwidth-reservation-decision policy table 89, which is provided in the policy server 80 in advance. When the bandwidth-reservation-decision policy table 89 is identical to the table indicated in FIG. 6, the bandwidth-reservation-decision policy table 89 indicates that the maximum amount of a bandwidth which can be reserved for the user name "Kurose" is "5 Mbps." That is, the bandwidth reservation parameter in the Resv message in accordance with the RSVP protocol does not exceed the limit. Therefore, the bandwidth-reservation-permission decision unit 91 makes a decision to permit the bandwidth reservation. Then, the COPS transmission unit 92 sends permission result information g, which is generated by the bandwidth-reservation-permission decision unit 91, to the RSVP-compatible router 50.

When the bandwidth reservation is permitted, details of the permission is transferred to the target-apparatus determining unit 84 and the service mapping unit 86. The target-apparatus determining unit 84 determines the location of the RSVP-incompatible router 70 based on the details of the permission and the contents of the path information table 83, which is provided in advance in the policy server 80. When the path information table 83 is the table illustrated in FIG. 7, the RSVP-incompatible router 70 is located next to the RSVP-compatible router 50. Therefore, the RSVP-incompatible router 70 is determined to be a target apparatus. The target-apparatus determination information indicating the RSVP-incompatible router 70 is supplied to the service mapping unit 86, which determines a value to be set in the RSVP-incompatible router 70, by using the service mapping table 85 based on the bandwidth-reservation information obtained from the bandwidth-reservation-permission decision unit 91. When the service mapping table 85 in the policy server 80 is the service mapping table illustrated in FIG. 8, the apparatus setting unit 87 performs a setting operation so as to assign the priority "3" to the user name "Kurose," since the bandwidth-reservation information on the RSVP-compatible router 50, which is received by the COPS reception unit 90, includes the user name "Kurose" and the reserved bandwidth of "5 Mbps." The setting information h on this setting is sent by the SNMP transmission unit 88 to the RSVP-incompatible router 70.

The RSVP-incompatible router 70 receives the setting information h through the SNMP reception unit 75, and the bandwidth-reservation-item setting unit 76 performs an operation of setting a bandwidth-reservation item. At this time, the service mapping unit 77 determines the bandwidth-reservation item corresponding to the priority assignment "3," and the bandwidth-reservation execution unit 78 executes the bandwidth reservation in accordance with the determined bandwidth-reservation item.

The RSVP-compatible router 50 receives the permission result information g through the COPS reception unit 57. Since, in this case, the permission result information g indicates permission, the permission result information g is transferred to the bandwidth-reservation decision unit 58, which sends a Resv message i through the Resv-message transmission unit 56 to the RSVP-incompatible router 70 in accordance with the RSVP protocol. When the permission result information g indicates rejection, the bandwidth-reservation decision unit 58 sends rejection information n to the client 41. In addition, when the permission result information g indicates permission, the bandwidth-reservation-item setting unit 60 sets a value of an item corresponding to the bandwidth reservation parameter by using the service mapping unit 61. Then, the bandwidth-reservation execution unit 62 assigns a bandwidth of "5 Mbps" as a reserved bandwidth for the communication with the user name "Kurose."

As explained above, in the second embodiment, when the RSVP-compatible router 50 receives a service request for a bandwidth reservation, the router 50 asks the policy server 80 to make a decision as to whether to grant the service request or not. The policy server 80 makes a decision as to whether to grant the service request or not, based on the bandwidth-reservation-decision policy table 89, and sends the result of the decision to the router 50. In addition, when the bandwidth reservation is permitted, the policy server 80 statically determines the router 70 as a service-incompatible router on the path, based on the bandwidth-reservation information and the path information table, where the bandwidth-reservation information is supplied to the policy server 80 when the decision is made, and the path information table is set in advance. Then, the policy server 80 sets in the service-incompatible router 70 a service corresponding to the bandwidth reservation service in the router 50. When the router 50 receives the result of the decision, and the result indicates permission, the router 50 executes the bandwidth reservation. Thus, the policy server 80 can determine the service-incompatible router 70 on the path, based on the information which the policy server 80 receives for the admission control, in which the above decision as to whether to permit the bandwidth reservation or not is made. Then, the policy server 80 can assign a service to the router. Further, the policy server 80 can control services in a unified way.

The third embodiment is explained below. First, the constructions of the respective apparatuses used in the third embodiment are explained.

Figure 11:
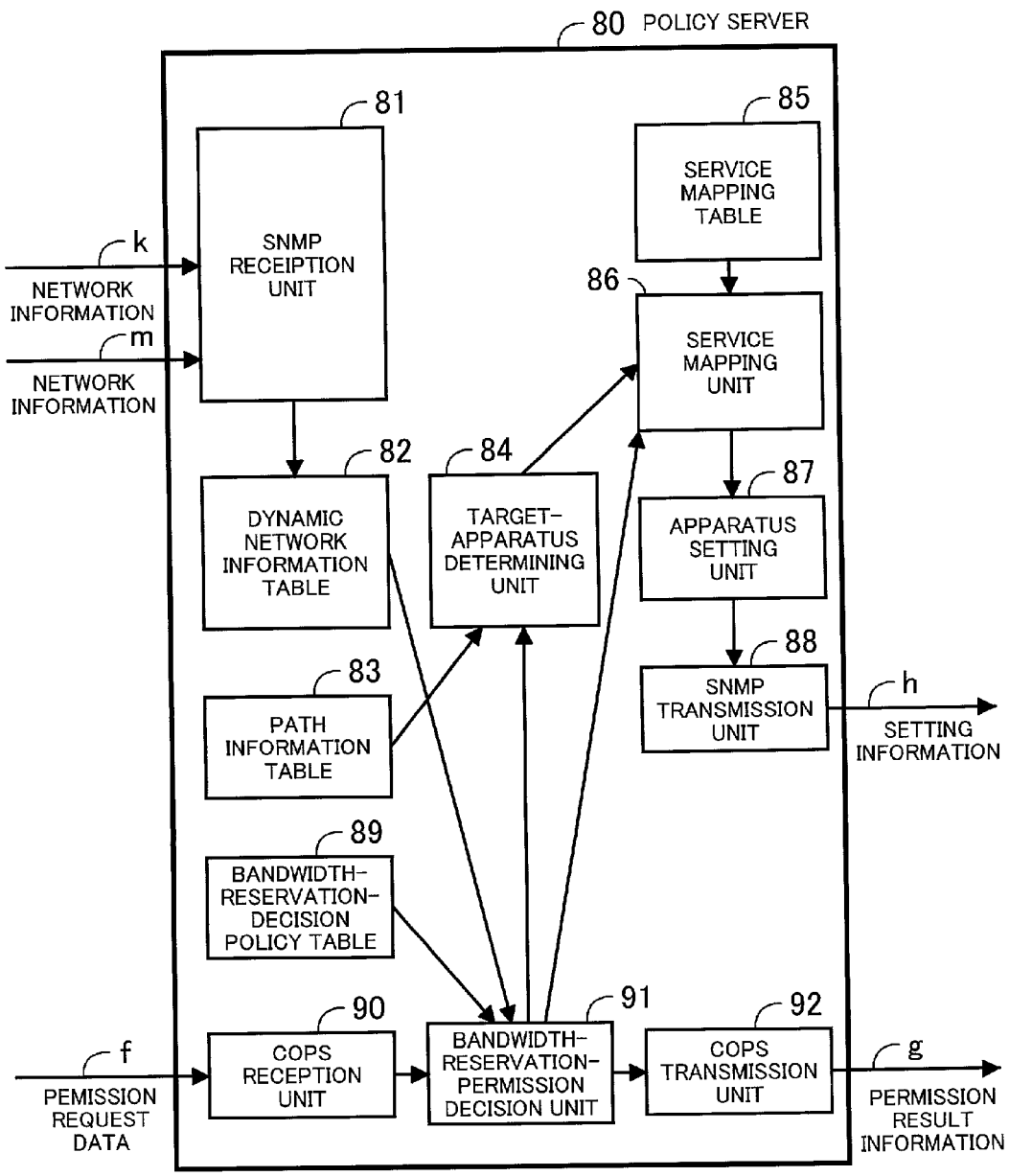
FIG. 11 is a block diagram illustrating an exemplary construction of a policy server in the third embodiment.
Figure 12:
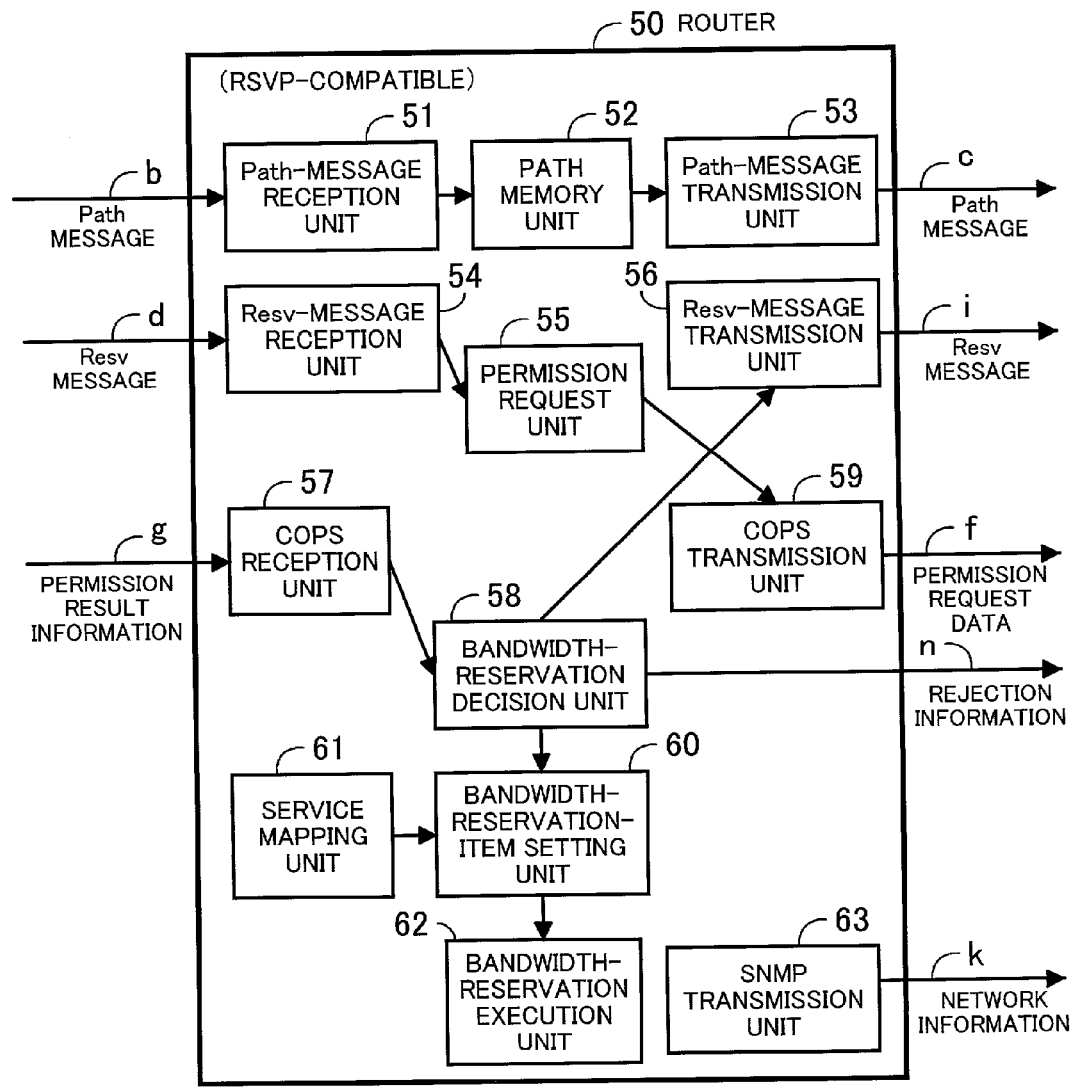
FIG. 12 is a block diagram illustrating an exemplary construction of an RSVP-compatible router in the third embodiment.
Figure 13:
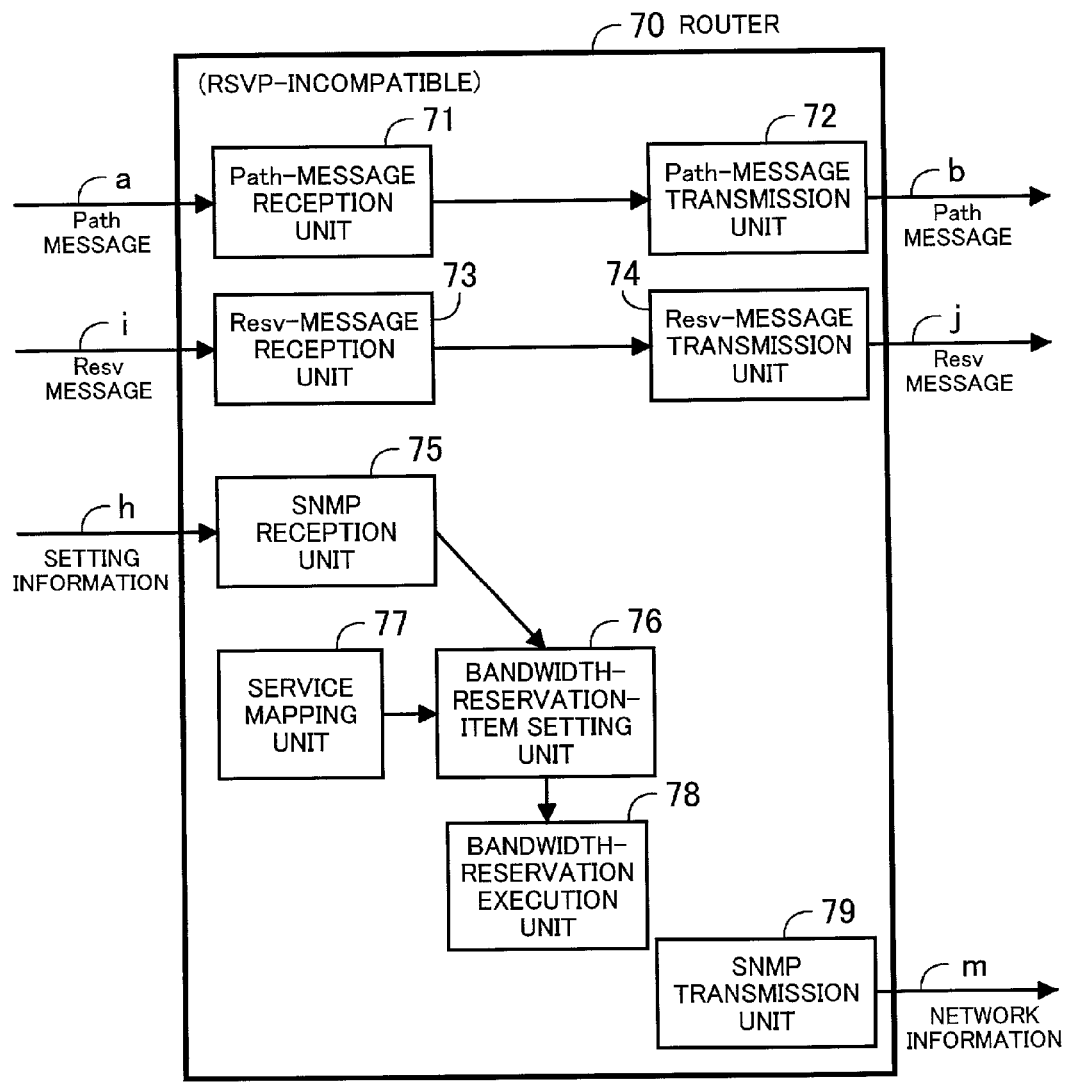
FIG. 13 is a block diagram illustrating an exemplary construction of an RSVP-incompatible router in the second embodiment.

FIGS. 11, 12 and 13 are block diagrams respectively illustrating exemplary constructions of a policy server, an RSVP-compatible router, and an RSVP-incompatible router in the third embodiment.

As illustrated in FIG. 11, the policy server 80 comprises an SNMP reception unit 81, a dynamic network information table 82, a path information table 83, a target-apparatus determining unit 84, a service mapping table 85, a service mapping unit 86, an apparatus setting unit 87, an SNMP transmission unit 88, a bandwidth-reservation-decision policy table 89, a COPS reception unit 90, a bandwidth-reservation-permission decision unit 91, and a COPS transmission unit 92. The SNMP reception unit 81 receives network information k from the RSVP-compatible router 50, and network information m from the RSVP-incompatible router 70. The SNMP transmission unit 88 sends setting information h to the RSVP-incompatible router 70. The COPS reception unit 90 receives permission request data f from the RSVP-compatible router 50. The COPS transmission unit 92 sends permission result information g to the RSVP-compatible router 50.

As illustrated in FIG. 12, the RSVP-compatible router 50 comprises a Path-message reception unit 51, a path memory unit 52, a Path-message transmission unit 53, a Resv-message reception unit 54, a permission request unit 55, a Resv-message transmission unit 56, a COPS reception unit 57, a bandwidth-reservation decision unit 58, a bandwidth-reservation-item setting unit 60, a service mapping unit 61, a bandwidth-reservation execution unit 62, and an SNMP transmission unit 63. The Path-message reception unit 51 receives a Path message b from the RSVP-incompatible router 70, the Path-message transmission unit 53 sends a Path message c to the client 41, the Resv-message reception unit 54 receives a Resv message d from the client 41, and the Resv-message transmission unit 56 sends a Resv message i to the RSVP-incompatible router 70. When the bandwidth-reservation decision unit 58 decides not to permit a bandwidth reservation, the bandwidth-reservation decision unit 58 sends rejection information n to the client 41. The COPS reception unit 57 receives the permission result information g from the policy server 80. The COPS transmission unit 59 sends the permission request data f to the policy server 80. The SNMP transmission unit 63 sends the network information k to the policy server 80.

As illustrated in FIG. 13, the RSVP-incompatible router 70 comprises a Path-message reception unit 71, a Path-message transmission unit 72, a Resv-message reception unit 73, a Resv-message transmission unit 74, an SNMP reception unit 75, a bandwidth-reservation-item setting unit 76, a service mapping unit 77, and a bandwidth-reservation execution unit 78, and an SNMP transmission unit 79. The Path-message reception unit 71 receives a Path message a from the server 42, the Path-message transmission unit 72 sends a Path message b to the RSVP-compatible router 50, the Resv-message reception unit 73 receives a Resv message i from the RSVP-compatible router 50, the Resv-message transmission unit 74 sends a Resv message j to the server 42, the SNMP reception unit 75 receives the setting information h from the policy server 80, and the SNMP transmission unit 79 sends the network information m to the policy server 80.

Next, the operations of the network elements having the above constructions are explained below.

As a prerequisite for the operations in the third embodiment, the RSVP-compatible router 50 periodically sends the network information k through the SNMP transmission unit 63 to the policy server 80, where the network information k includes details of settings and load conditions in the RSVP-compatible router 50. In addition, the RSVP-incompatible router 70 periodically sends the network information m through the SNMP transmission unit 79 to the policy server 80, where the network information m includes details of settings and load conditions in the RSVP-incompatible router 70. The SNMP reception unit 81 in the policy server 80 receives the above network information k, m, and the policy server 80 stores the network information in the dynamic network information table 82. Therefore, the contents of the dynamic network information table 82 are dynamically updated corresponding to the current state of the network. The dynamic network information table 82 is used as reference data when the bandwidth-reservation-permission decision unit 91 makes the decision as to whether to permit a bandwidth reservation or not.

Under the above condition, the server 42 sends a Path message a to the RSVP-incompatible router 70 in accordance with the RSVP protocol. The RSVP-incompatible router 70 does not process the Path message a in accordance with the RSVP protocol, and the Path-message transmission unit 72 sends the Path message a as a Path message b to the RSVP-compatible router 50 in accordance with the RSVP protocol.

When the Path-message reception unit 51 in the RSVP-compatible router 50 receives the Path message b, the RSVP-compatible router 50 obtains from the Path message b information on the path of the Path message b from its source to the RSVP-compatible router 50, and stores the information on the path in the path memory unit 52. Thereafter, the Path-message transmission unit 53 sends a Path message c to the client 41 in accordance with the RSVP protocol.

The client 41 sends a Resv message d to the RSVP-compatible router 50 in accordance with the RSVP protocol in order to request a bandwidth reservation service. In an example of the request for the bandwidth reservation, the user name is "Kurose," and the bandwidth is "5 Mbps."

When the Resv-message reception unit 54 in the RSVP-compatible router 50 receives the Resv message d in accordance with the RSVP protocol, the Resv message d is transferred to the permission request unit 55. The permission request unit 55 supplies to the COPS transmission unit 59 permission request data f which requests a decision as to whether to permit the bandwidth reservation or not, and the COPS transmission unit 59 sends the permission request data f to the policy server 80.

The COPS reception unit 90 in the policy server 80 receives the permission request data f, and transfers the permission request data f to the bandwidth-reservation-permission decision unit 91. The bandwidth-reservation-permission decision unit 91 makes a decision as to whether to permit the bandwidth reservation or not, based on the dynamic network information table 82 and the bandwidth-reservation-decision policy table 89, which is provided in the policy server 80 in advance. An example of the dynamic network information table 82 is illustrated in FIG. 14.

FIG. 14 is a diagram illustrating an example of the dynamic network information table. The dynamic network information table stores the network information sent from the respective network elements. For example, the dynamic network information table contains fields for indicating a section of a path and a congestion state of the section. That is, in this example, the dynamic network information table stores the information on the congestion state. In the example illustrated in FIG. 14, the dynamic network information table indicates that the section from the apparatus A through the apparatuses B and C to the apparatus D is not congested, where the client 41 is indicated as the apparatus A, the router 50 is indicated as the apparatus B, the router 70 is indicated as the apparatus C, and the server 42 is indicated as the apparatus D. In addition, the dynamic network information table indicates that the section between the apparatuses E and F is congested, where the apparatuses E and F are other routers in the network.

When the bandwidth-reservation-permission decision unit 91 receives the permission request data f, the bandwidth-reservation-permission decision unit 91 makes a decision as to whether to permit the bandwidth reservation or not, based on the dynamic network information table 82 and the bandwidth-reservation-decision policy table 89. When the bandwidth-reservation-decision policy table 89 is the table illustrated in FIG. 6, the bandwidth-reservation-permission decision unit 91 can recognize that the requested amount of the bandwidth reservation does not exceed the limit based on the bandwidth-reservation-decision policy. In addition, when the dynamic network information table 82 is the table illustrated in FIG. 14, the bandwidth-reservation-permission decision unit 91 can recognize that the section between the client 41 and the server 42 is not congested. Therefore, the bandwidth-reservation-permission decision unit 91 makes a decision to permit the bandwidth reservation. The COPS transmission unit 92 sends the decision to permit the bandwidth reservation as permission result information g to the RSVP-compatible router 50. In addition, when the permission result information g indicates permission, details of the permission are supplied to the target-apparatus determining unit 84 and the service mapping unit 86. The target-apparatus determining unit 84 determines the location of the RSVP-incompatible router 70 based on the details of the permission and the contents of the path information table 83, which is provided in the policy server 80 in advance. When the path information table 83 is the table illustrated in FIG. 7, the RSVP-incompatible router 70 is located next to the RSVP-compatible router 50. Therefore, the RSVP-incompatible router 70 is determined to be a target apparatus. The information indicating the RSVP-incompatible router 70 as the determined apparatus is supplied to the service mapping unit 86, which determines a value to be set in the RSVP-incompatible router 70, by using the service mapping table 85 based on the bandwidth-reservation information obtained from the bandwidth-reservation-permission decision unit 91. When the service mapping table 85 in the policy server 80 is the service mapping table illustrated in FIG. 8, the apparatus setting unit 87 performs a setting operation so as to assign the priority "3" to the user name "Kurose," since the bandwidth-reservation information on the RSVP-compatible router 50, which is received by the COPS reception unit 90, includes the user name "Kurose" and the reserved bandwidth of "5 Mbps." The setting information h on this setting is sent by the SNMP transmission unit 88 to the RSVP-incompatible router 70.

The RSVP-incompatible router 70 receives the setting information h through the SNMP reception unit 75, and the bandwidth-reservation-item setting unit 76 performs an operation of setting a bandwidth-reservation item. At this time, the service mapping unit 77 determines the bandwidth-reservation item corresponding to the priority assignment "3," and the bandwidth-reservation execution unit 78 executes the bandwidth reservation in accordance with the determined bandwidth-reservation item.

The RSVP-compatible router 50 receives the permission result information g through the COPS reception unit 57. Since, in this case, the permission result information g indicates permission, the permission result information g is transferred to the bandwidth-reservation decision unit 58, which sends a Resv message i through the Resv-message transmission unit 56 to the RSVP-incompatible router 70 in accordance with the RSVP protocol. When the permission result information g indicates rejection, the bandwidth-reservation decision unit 58 sends rejection information n to the client 41. In addition, when the permission result information g indicates permission, the bandwidth-reservation-item setting unit 60 sets a value of an item corresponding to the bandwidth reservation parameter by using the service mapping unit 61. Then, the bandwidth-reservation execution unit 62 assigns a bandwidth of "5 Mbps" as a reserved bandwidth for the communication with the user name "Kurose."

The Resv-message reception unit 73 in the RSVP-incompatible router 70 receives a Resv message i in accordance with the RSVP protocol. However, since the RSVP-incompatible router 70 cannot process the Resv message i, the Resv-message transmission unit 74 in the RSVP-incompatible router 70 sends the Resv message i as a Resv message j to the server 42 in accordance with the RSVP protocol.

As explained above, in the third embodiment, when the RSVP-compatible router 50 receives a service request for a bandwidth reservation, the router 50 asks the policy server 80 to make a decision as to whether to grant the service request or not. The policy server 80 makes a decision as to whether to grant the service request or not, based on the bandwidth-reservation-decision policy table 89 and the dynamic network information table 82, and sends the result of the decision to the router 50. In addition, when the permission result information g indicates permission, the policy server 80 statically determines the router 70 as a service-incompatible router on the path, based on the bandwidth-reservation information and the path information table, where the bandwidth-reservation information is supplied to the policy server 80 when the decision is made, and the path information table is set in advance. Then, the policy server 80 sets in the service-incompatible router 70 a service corresponding to the bandwidth reservation service in the router 50. When the RSVP-compatible router 50 receives the result of the decision, and the result indicates permission, the router 50 executes the bandwidth reservation. Thus, the policy server 80 can determine the service-incompatible router 70 on the path, based on the information which the policy server 80 receives for the admission control, in which the above decision as to whether to permit the bandwidth reservation or not is made. Then, the policy server 80 can assign a service to the router. In addition, the policy server 80 can control services in a unified way. Further, the policy server 80 can make a decision according to the dynamic network state.

The fourth embodiment is explained below. First, the constructions of the respective apparatuses used in the fourth embodiment are explained. Since the RSVP-incompatible router 70 in the fourth embodiment is identical with the RSVP-incompatible router 70 in the third embodiment, only the policy server 80 and the RSVP-compatible router 50 in the fourth embodiment are explained below.

Figure 15:
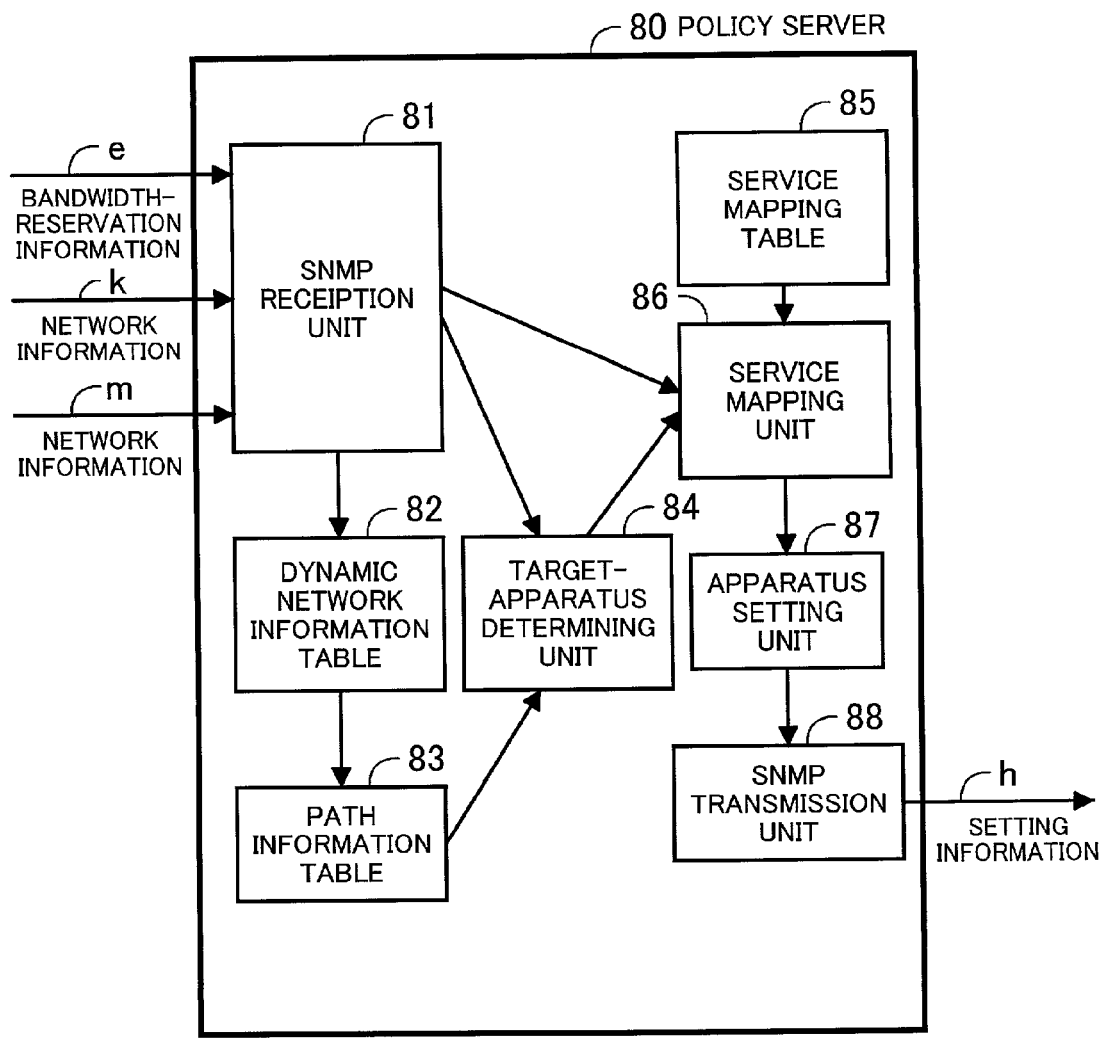
FIG. 15 is a block diagram illustrating an exemplary construction of a policy server in the fourth embodiment.
Figure 16:
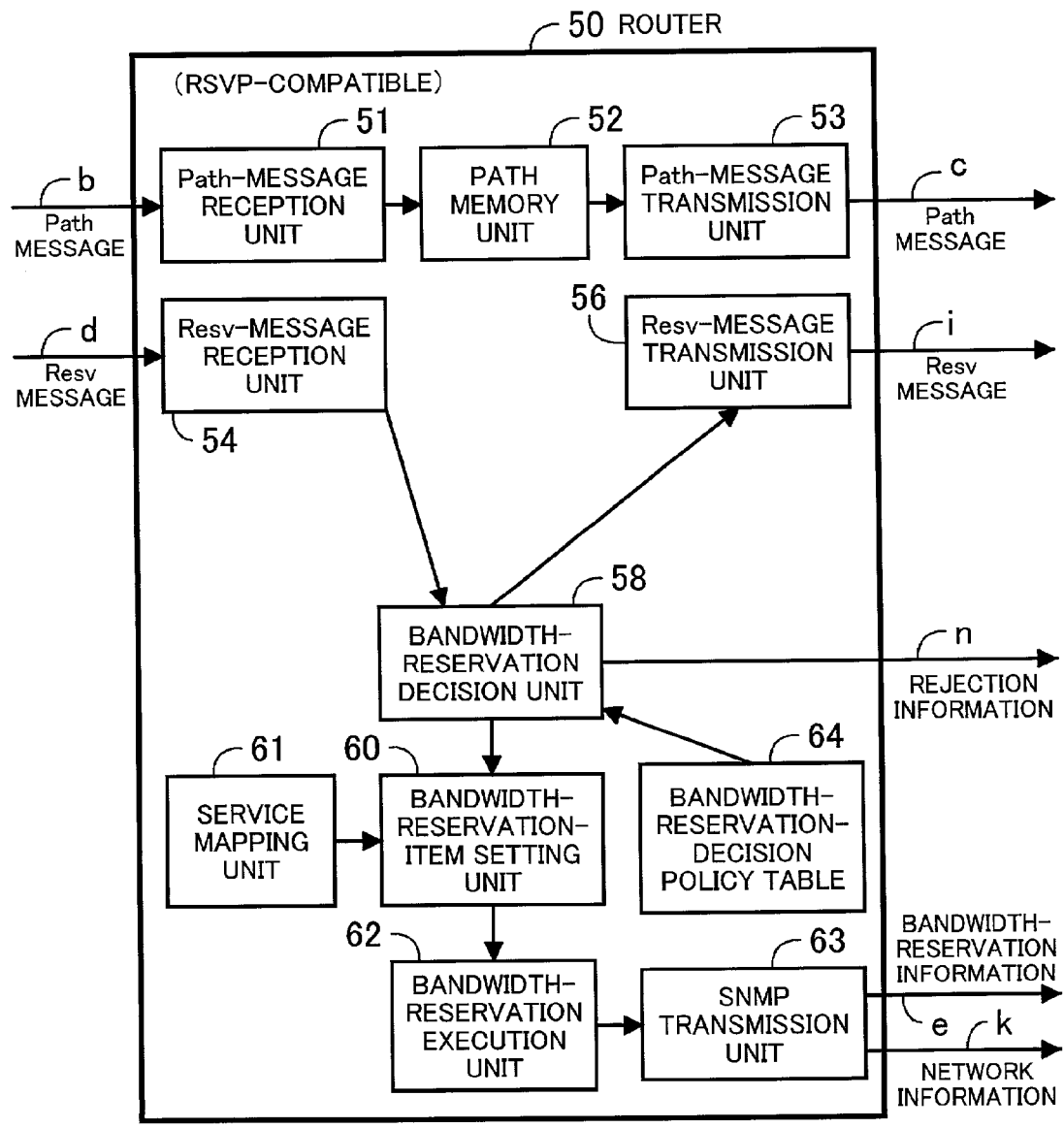
FIG. 16 is a block diagram illustrating an exemplary construction of an RSVP-compatible router in the fourth embodiment.

FIGS. 15 and 16 are block diagrams respectively illustrating exemplary constructions of a policy server and an RSVP-compatible router in the fourth embodiment.

As illustrated in FIG. 15, the policy server 80 comprises an SNMP reception unit 81, a dynamic network information table 82, a path information table 83, a target-apparatus determining unit 84, a service mapping table 85, a service mapping unit 86, an apparatus setting unit 87, and an SNMP transmission unit 88. The SNMP reception unit 81 receives bandwidth-reservation information e and network information k from the RSVP-compatible router 50, and network information m from the RSVP-incompatible router 70. The SNMP transmission unit 88 sends setting information h to the RSVP-incompatible router 70.

As illustrated in FIG. 16, the RSVP-compatible router 50 comprises a Path-message reception unit 51, a path memory unit 52, a Path-message transmission unit 53, a Resv-message reception unit 54, a Resv-message transmission unit 56, a bandwidth-reservation decision unit 58, a bandwidth-reservation-item setting unit 60, a service mapping unit 61, a bandwidth-reservation execution unit 62, an SNMP transmission unit 63, and a bandwidth-reservation-decision policy table 64. The Path-message reception unit 51 receives a Path message b from the RSVP-incompatible router 70, the Path-message transmission unit 53 sends a Path message c to the client 41, the Resv-message reception unit 54 receives a Resv message d from the client 41, and the Resv-message transmission unit 56 sends a Resv message i to the RSVP-incompatible router 70. When the bandwidth-reservation decision unit 58 decides not to permit a bandwidth reservation, the bandwidth-reservation decision unit 58 sends rejection information n to the client 41. The SNMP transmission unit 63 sends the bandwidth-reservation information e and the network information k to the policy server 80.

Next, the operations of the network elements illustrated in FIGS. 15, 16, and 13 are explained below.

As a prerequisite for the operations in the fourth embodiment, the RSVP-compatible router 50 periodically sends the network information k through the SNMP transmission unit 63 to the policy server 80, where the network information k includes details of settings and load conditions in the RSVP-compatible router 50. In addition, the RSVP-incompatible router 70 periodically sends the network information m through the SNMP transmission unit 79 to the policy server 80, where the network information m includes details of settings and load conditions in the RSVP-incompatible router 70. The SNMP reception unit 81 in the policy server 80 receives the above network information k, m, and the policy server 80 stores the network information in the dynamic network information table 82, which is used as data of the path information table 83. Therefore, the contents of the dynamic network information table 82 are dynamically updated corresponding to the current state of the network. The updated contents of the dynamic network information table 82 are reflected in the path information table 83.

Under the above condition, the server 42 sends a Path message a to the RSVP-incompatible router 70 in accordance with the RSVP protocol. The RSVP-incompatible router 70 does not process the Path message a in accordance with the RSVP protocol, and the Path-message transmission unit 72 sends the Path message a as a Path message b to the RSVP-compatible router 50 in accordance with the RSVP protocol.

When the Path-message reception unit 51 in the RSVP-compatible router 50 receives the Path message b, the RSVP-compatible router 50 obtains from the Path message b information on the path of the Path message b from its source to the RSVP-compatible router 50, and stores the information on the path in the path memory unit 52. Thereafter, the Path-message transmission unit 53 sends a Path message c to the client 41 in accordance with the RSVP protocol.

The client 41 sends a Resv message d to the RSVP-compatible router 50 in accordance with the RSVP protocol in order to request a bandwidth reservation service. In an example of the request for the bandwidth reservation, the user name is "Kurose," and the bandwidth is "5 Mbps."

When the Resv-message reception unit 54 in the RSVP-compatible router 50 receives the Resv message d in accordance with the RSVP protocol, the bandwidth-reservation decision unit 58 makes a decision as to whether to permit the bandwidth reservation. In the decision, the bandwidth-reservation-decision policy table 64, which is provided in advance in the RSVP-compatible router 50, is used. When the bandwidth-reservation-decision policy table 64 is the bandwidth-reservation-decision policy table illustrated in FIG. 6, the bandwidth-reservation-decision policy indicates that the maximum amount of a bandwidth which can be reserved for the user name "Kurose" is "5 Mbps." That is, the bandwidth reservation parameter in the Resv message in accordance with the RSVP protocol does not exceed the limit. Therefore, the bandwidth-reservation decision unit 58 makes a decision to permit the bandwidth reservation.

When the bandwidth reservation is permitted, the Resv-message transmission unit 56 sends a Resv message i to the RSVP-incompatible router 70 in accordance with the RSVP protocol. When the bandwidth reservation is not permitted, the bandwidth-reservation decision unit 58 sends rejection information n to the client 41. Since, in this example, the bandwidth-reservation decision unit 58 permits the bandwidth reservation, the bandwidth-reservation-item setting unit 60 sets a bandwidth-reservation-item. That is, the bandwidth-reservation-item setting unit 60 sets a value of an item corresponding to the bandwidth-reservation parameter by using the service mapping unit 61. Then, the bandwidth-reservation execution unit 62 assigns a bandwidth of "5 Mbps" as a reserved bandwidth for the communication with the user name "Kurose." In addition, after the bandwidth is reserved, the bandwidth-reservation execution unit 62 supplies bandwidth-reservation information to the SNMP transmission unit 63. The SNMP transmission unit 63 sends the bandwidth-reservation information e to the policy server 80.

The Resv-message reception unit 73 in the RSVP-incompatible router 70 receives a Resv message i in accordance with the RSVP protocol. However, since the RSVP-incompatible router 70 cannot process the Resv message i, the Resv-message transmission unit 74 sends the Resv message i as a Resv message j to the server 42 in accordance with the RSVP protocol.

On the other hand, the SNMP reception unit 81 in the policy server 80 receives the bandwidth-reservation information e. Thus, the RSVP-incompatible router 70 obtains the bandwidth-reservation information, and recognizes that reservation is made in the RSVP-compatible router 50. The bandwidth-reservation information is then transferred to the target-apparatus determining unit 84 and the service mapping unit 86. The target-apparatus determining unit 84 determines the location of the RSVP-incompatible router 70 based on path information included in the bandwidth-reservation information and network information which is set in the path information table 83. Since the target-apparatus determining unit 84 uses the path information table 83 in which the contents of the dynamic network information table 82 are reflected, it is possible to respond to a dynamic changes of the paths in the network or failure in apparatuses. The dynamic changes of paths in the network may be caused, for example, when a difference occurs between the initial and current contents of the path information table. When the path information table 83 is the path information table illustrated in FIG. 7, the RSVP-incompatible router 70 (the apparatus C) is located next to the RSVP-compatible router 50 (the apparatus B). Therefore, the RSVP-incompatible router 70 is determined to be a target apparatus. The target-apparatus determination information is supplied to the service mapping unit 86, which determines a value to be set in the RSVP-incompatible router 70, by using the service mapping table 85 based on the bandwidth-reservation information obtained from the SNMP reception unit 81. When the service mapping table 85 is the service mapping table illustrated in FIG. 8, the service mapping unit 86 can recognize that the priority assignment corresponding to the user name and the reserved bandwidth is "3," since the bandwidth-reservation information on the RSVP-compatible router 50, which is received by the SNMP reception unit 81, includes the user name "Kurose" and the reserved bandwidth of "5 Mbps." Therefore, the service mapping unit 86 assigns the priority "3" to the user name "Kurose," and the apparatus setting unit 87 determines the priority assignment of "3" to the RSVP-incompatible router 70. Information on the priority assignment is supplied to the SNMP transmission unit 88, and is then sent to the RSVP-incompatible router 70 as the setting information h.

The RSVP-incompatible router 70 receives the setting information h through the SNMP reception unit 75, and the bandwidth-reservation-item setting unit 76 performs an operation of setting a bandwidth-reservation item. At this time, the service mapping unit 77 determines the bandwidth-reservation item corresponding to the priority assignment "3," and the bandwidth-reservation execution unit 78 executes the bandwidth reservation in accordance with the determined bandwidth-reservation item.

As explained above, in the fourth embodiment, the policy server 80 holds network information obtained from the respective routers 50, 70, as the data of the path information table 83 which are referred to when a path is selected. When the policy server 80 receives, from an RSVP-compatible router, information indicating a request for a bandwidth reservation, the target-apparatus determining unit detects a router which is not yet compatible with the RSVP protocol, by comparing the newest information in the path information table with path information held before the newest information. Thus, the policy server 80 can dynamically set an appropriate service in a router which is not yet compatible with the RSVP protocol. Therefore, it is possible to effectively utilize RSVP-incompatible network resources in a network environment in which RSVP-compatible routers and RSVP-incompatible routers are mixed.

The fifth embodiment is explained below. First, the constructions of the respective apparatuses used in the fifth embodiment are explained. Since the RSVP-compatible router 50 and the RSVP-incompatible router 70 in the fifth embodiment are respectively identical with the RSVP-compatible router 50 and the RSVP-incompatible router 70 in the third embodiment, only the policy server 80 in the fifth embodiment is explained below.

Figure 17:
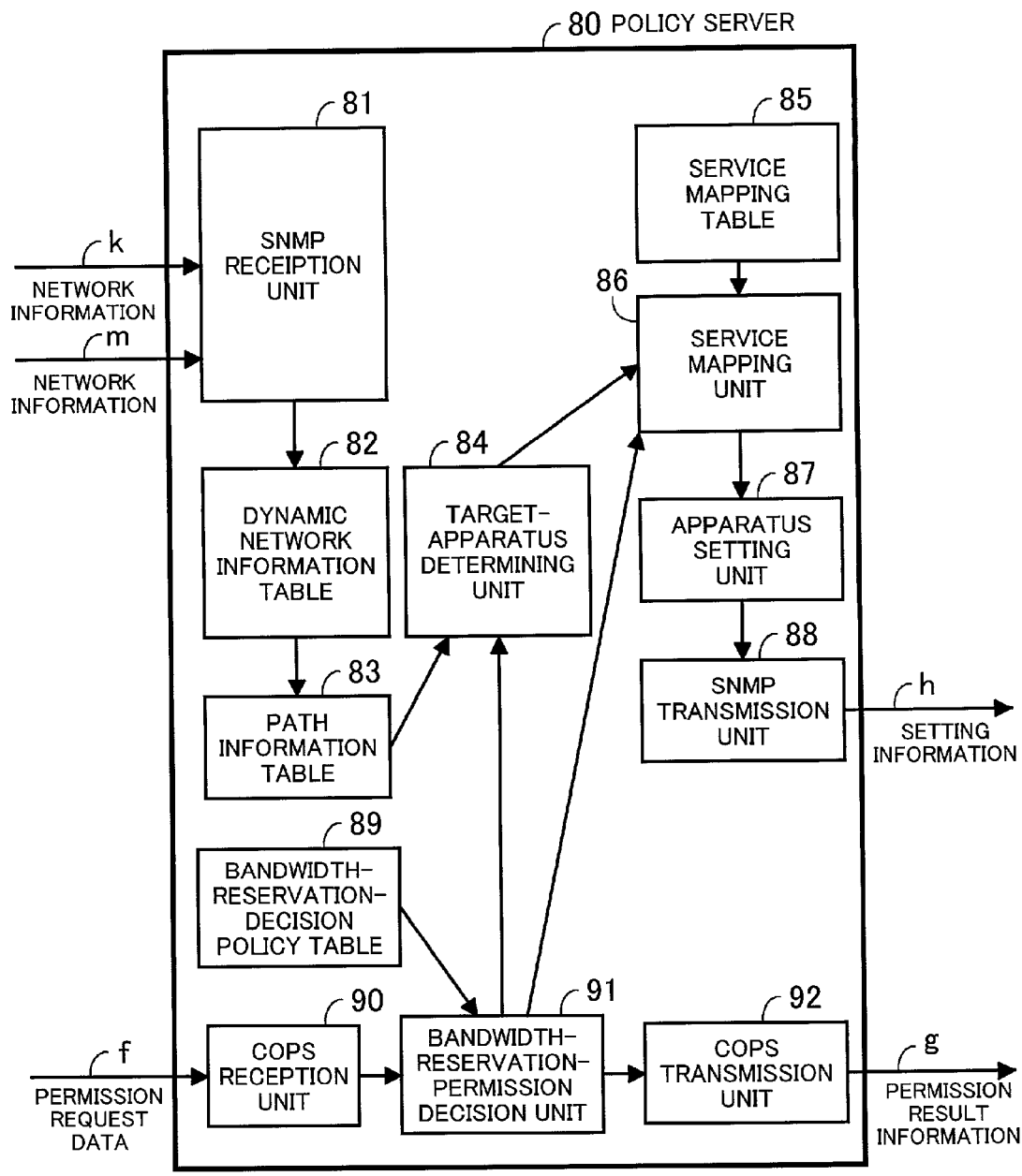
FIG. 17 is a block diagram illustrating an exemplary construction of a policy server in the fifth embodiment.

FIG. 17 is a block diagram illustrating an exemplary construction of a policy server in the fifth embodiment.

As illustrated in FIG. 17, the policy server 80 comprises an SNMP reception unit 81, a dynamic network information table 82, a path information table 83, a target-apparatus determining unit 84, a service mapping table 85, a service mapping unit 86, an apparatus setting unit 87, an SNMP transmission unit 88, a bandwidth-reservation-decision policy table 89, a COPS reception unit 90, a bandwidth-reservation-permission decision unit 91, and a COPS transmission unit 92. The SNMP reception unit 81 receives network information k from the RSVP-compatible router 50, and network information m from the RSVP-incompatible router 70. The SNMP transmission unit 88 sends setting information h to the RSVP-incompatible router 70. The COPS reception unit 90 receives permission request data f from the RSVP-compatible router 50. The COPS transmission unit 92 sends permission result information g to the RSVP-compatible router 50.

Next, the operations of the network elements illustrated in FIGS. 17, 12, and 13 are explained below.

As a prerequisite for the operations in the fifth embodiment, the RSVP-compatible router 50 periodically sends the network information k through the SNMP transmission unit 63 to the policy server 80, where the network information k includes details of settings and load conditions in the RSVP-compatible router 50. In addition, the RSVP-incompatible router 70 periodically sends the network information m through the SNMP transmission unit 79 to the policy server 80, where the network information m includes details of settings and load conditions in the RSVP-incompatible router 70. The SNMP reception unit 81 in the policy server 80 receives the above network information k, m, and the policy server 80 stores the network information in the dynamic network information table 82, which is used as data of the path information table 83. Therefore, the contents of the dynamic network information table 82 are dynamically updated corresponding to the current state of the network. The updated contents of the dynamic network information table 82 are reflected in the path information table 83.

Under the above condition, the server 42 sends a Path message a to the RSVP-incompatible router 70 in accordance with the RSVP protocol. The RSVP-incompatible router 70 does not process the Path message a in accordance with the RSVP protocol, and the Path-message transmission unit 72 sends the Path message a as a Path message b to the RSVP-compatible router 50 in accordance with the RSVP protocol.

When the Path-message reception unit 51 in the RSVP-compatible router 50 receives the Path message b, the RSVP-compatible router 50 obtains from the Path message b information on the path of the Path message b from its source to the RSVP-compatible router 50, and stores the information on the path in the path memory unit 52. Thereafter, the Path-message transmission unit 53 sends a Path message c to the client 41 in accordance with the RSVP protocol.

The client 41 sends a Resv message d to the RSVP-compatible router 50 in accordance with the RSVP protocol in order to request a bandwidth reservation service. In an example of the request for the bandwidth reservation, the user name is "Kurose," and the bandwidth is "5 Mbps."

When the Resv-message reception unit 54 in the RSVP-compatible router 50 receives the Resv message d in accordance with the RSVP protocol, the Resv message d is transferred to the permission request unit 55. The permission request unit 55 supplies to the COPS transmission unit 59 permission request data f which requests a decision as to whether to permit the bandwidth reservation or not, and the COPS transmission unit 59 sends the permission request data f to the policy server 80.

The COPS reception unit 90 in the policy server 80 receives the permission request data f, and transfers the permission request data f to the bandwidth-reservation-permission decision unit 91. The bandwidth-reservation-permission decision unit 91 makes a decision as to whether to permit the bandwidth reservation or not, based on the bandwidth-reservation-decision policy table 89, which is provided in the policy server 80 in advance. When the bandwidth-reservation-decision policy table 89 is the table illustrated in FIG. 6, the bandwidth-reservation-decision policy table 89 indicates that the maximum amount of a bandwidth which can be reserved for the user name "Kurose" is "5 Mbps." That is, the bandwidth reservation parameter in the Resv message in accordance with the RSVP protocol does not exceed the limit. Therefore, the bandwidth-reservation-permission decision unit 91 makes a decision to permit the bandwidth reservation. The COPS transmission unit 92 sends the decision to permit the bandwidth reservation as permission result information g to the RSVP-compatible router 50.

In addition, when the permission result information g indicates permission, details of the permission are supplied to the target-apparatus determining unit 84 and the service mapping unit 86. The target-apparatus determining unit 84 determines the location of the RSVP-incompatible router 70 based on the details of the permission and the contents of the path information table 83. Since the contents of the dynamic network information table 82 are reflected in the path information table 83, it is possible to respond to dynamic changes of paths in the network or failure in apparatuses. The dynamic changes of paths in the network may be caused, for example, when a difference occurs between the initial and current contents of the path information table. For example, when the path information table 83 is the path information table illustrated in FIG. 7, and the dynamic network information table 82 is the dynamic network information table illustrated in FIG. 14, the RSVP-incompatible router 70 (the apparatus C) is located next to the RSVP-compatible router 50 (the apparatus B), and the path between the RSVP-compatible router 50 and the RSVP-incompatible router 70 is not congested. Therefore, the RSVP-incompatible router 70 is determined to be a target apparatus. The target-apparatus determination information is supplied to the service mapping unit 86, which determines a value to be set in the RSVP-incompatible router 70, by using the service mapping table 85 based on the bandwidth-reservation information obtained from the bandwidth-reservation-permission decision unit 91. When the service mapping table 85 in the policy server 80 is the service mapping table illustrated in FIG. 8, the apparatus setting unit 87 performs a setting operation so as to assign the priority of "3" to the user name "Kurose," since the bandwidth-reservation information on the RSVP-compatible router 50, which is received by the COPS reception unit 90, includes the user name "Kurose" and the reserved bandwidth of "5 Mbps." The setting information is sent through the SNMP transmission unit 88 to the RSVP-incompatible router 70.

The RSVP-incompatible router 70 receives the setting information h through the SNMP reception unit 75, and the bandwidth-reservation-item setting unit 76 performs an operation of setting a bandwidth-reservation item. At this time, the service mapping unit 77 determines the bandwidth-reservation item corresponding to the priority assignment "3," and the bandwidth-reservation execution unit 78 executes the bandwidth reservation in accordance with the determined bandwidth-reservation item.

The RSVP-compatible router 50 receives the permission result information g through the COPS reception unit 57. Since, in this case, the permission result information g indicates permission, the permission result information g is transferred to the bandwidth-reservation decision unit 58, which sends a Resv message i through the Resv-message transmission unit 56 to the RSVP-incompatible router 70 in accordance with the RSVP protocol. When the permission result information g indicates rejection, the bandwidth-reservation decision unit 58 sends rejection information n to the client 41. In addition, when the permission result information g indicates permission, the bandwidth-reservation-item setting unit 60 sets a value of an item corresponding to the bandwidth reservation parameter by using the service mapping unit 61. Then, the bandwidth-reservation execution unit 62 assigns a bandwidth of "5 Mbps" as a reserved bandwidth for the communication with the user name "Kurose."

As explained above, in the fifth embodiment, when the RSVP-compatible router 50 receives a service request for a bandwidth reservation, the policy server 80 can statically make a decision as to whether to grant the service request or not, based on the bandwidth-reservation-decision policy table 89. In addition, the policy server 80 can dynamically determine the router 70 as a service-incompatible router on the path, based on information received in the admission control and the path information table 83 in which the contents of the dynamic network information table 82 are reflected. Thus, the policy server 80 can assign a service to the service-incompatible router. Therefore, it is possible to effectively utilize RSVP-incompatible network resources in a dynamically varying network environment in which RSVP-compatible routers and RSVP-incompatible routers are mixed.

The sixth embodiment is explained below. First, the constructions of the respective apparatuses used in the sixth embodiment are explained. Since the RSVP-compatible router 50 and the RSVP-incompatible router 70 in the sixth embodiment are respectively identical with the RSVP-compatible router 50 and the RSVP-incompatible router 70 in the third embodiment, only the policy server 80 in the sixth embodiment is explained below.

Figure 18:
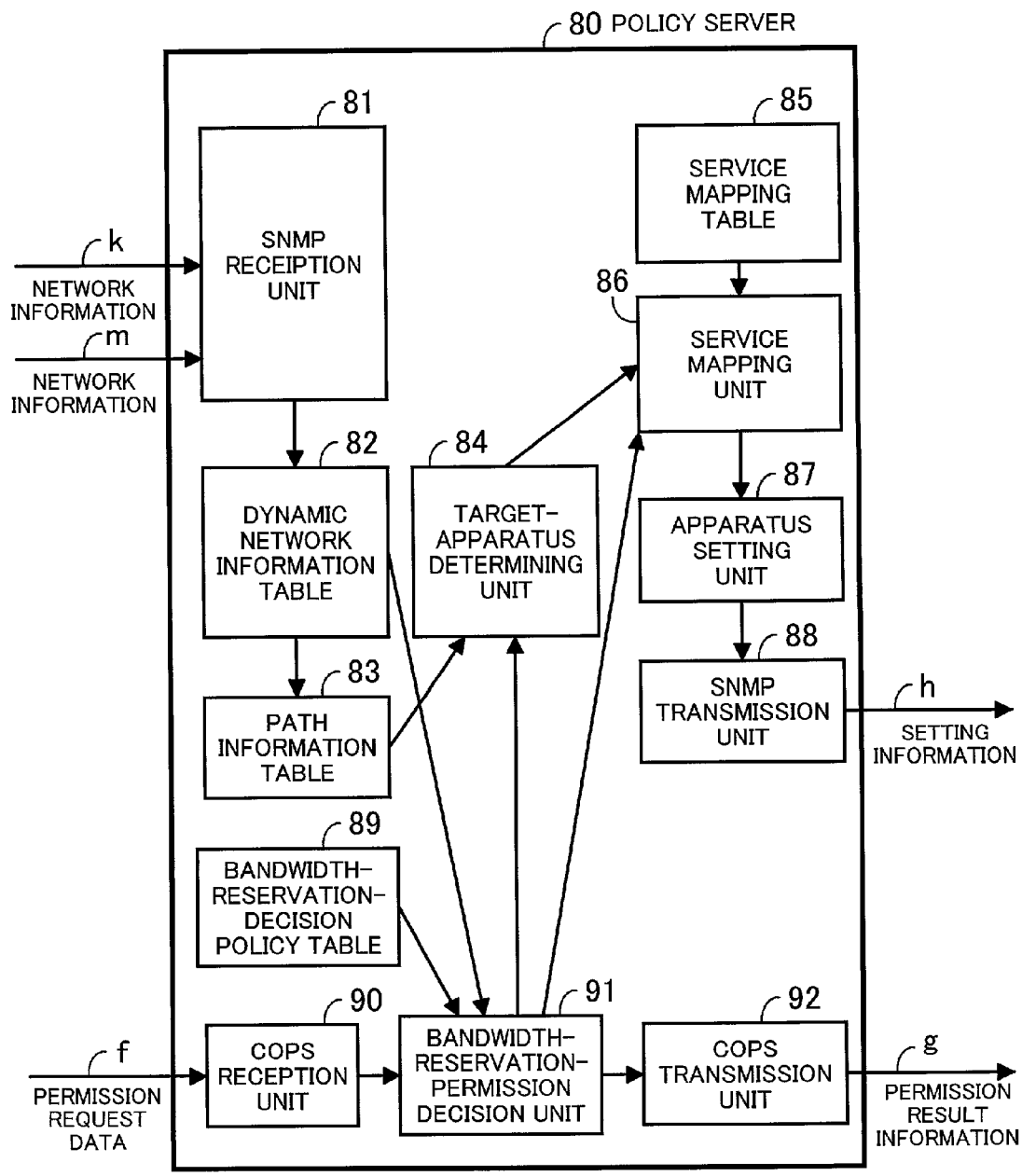
FIG. 18 is a block diagram illustrating an exemplary construction of a policy server in the sixth embodiment.
Figure 19A:
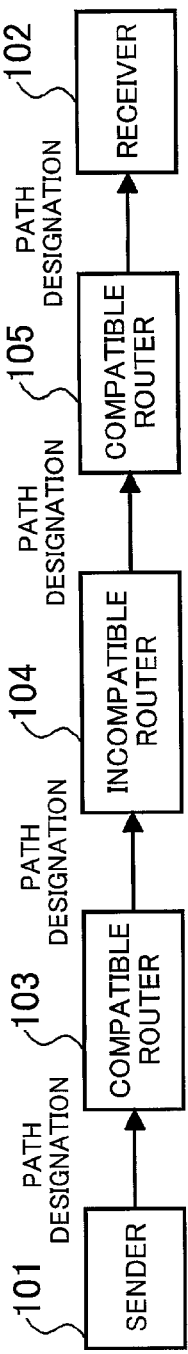
FIGS. 19(A), 19(B), and 19(C) are diagrams illustrating operations of conventional network elements, where FIG. 19(A) exhibits the first stage, FIG. 19(B) exhibits the second stage, and FIG. 19(C) exhibits the third stage.
Figure 19B:
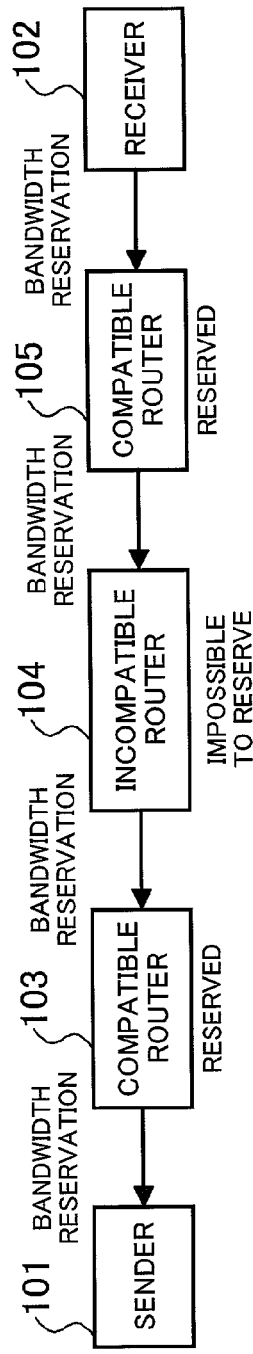
Figure 19C:
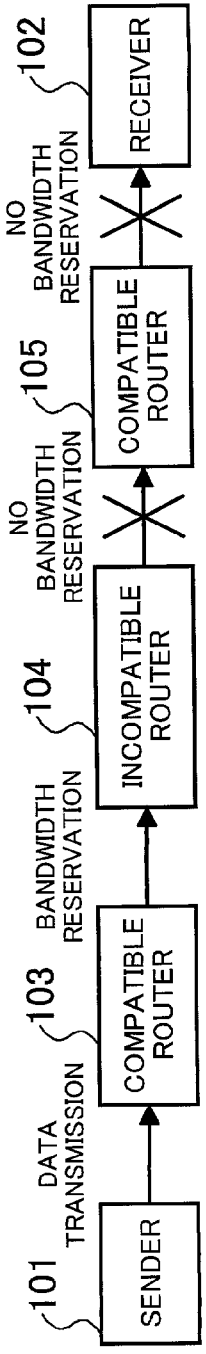
Figure 20C:
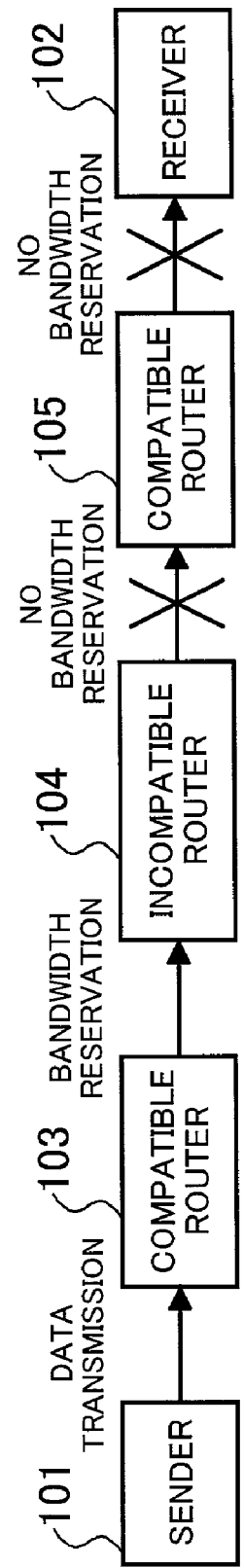

FIG. 18 is a block diagram illustrating an exemplary construction of a policy server in the sixth embodiment.

As illustrated in FIG. 18, the policy server 80 comprises an SNMP reception unit 81, a dynamic network information table 82, a path information table 83, a target-apparatus determining unit 84, a service mapping table 85, a service mapping unit 86, an apparatus setting unit 87, an SNMP transmission unit 88, a bandwidth-reservation-decision policy table 89, a COPS reception unit 90, a bandwidth-reservation-permission decision unit 91, and a COPS transmission unit 92. The SNMP reception unit 81 receives network information k from the RSVP-compatible router 50, and network information m from the RSVP-incompatible router 70. The SNMP transmission unit 88 sends setting information h to the RSVP-incompatible router 70. The COPS reception unit 90 receives permission request data f from the RSVP-compatible router 50. The COPS transmission unit 92 sends permission result information g to the RSVP-compatible router 50.

Next, the operations of the network elements illustrated in FIGS. 18, 12, and 13 are explained below.

As a prerequisite for the operations in the sixth embodiment, the RSVP-compatible router 50 periodically sends the network information k through the SNMP transmission unit 63 to the policy server 80, where the network information k includes details of settings and load conditions in the RSVP-compatible router 50. In addition, the RSVP-incompatible router 70 periodically sends the network information m through the SNMP transmission unit 79 to the policy server 80, where the network information m includes details of settings and load conditions in the RSVP-incompatible router 70. The SNMP reception unit 81 in the policy server 80 receives the above network information k, m, and the policy server 80 stores the network information in the dynamic network information table 82, which is used as data of the path information table 83. The dynamic network information table 82 is also used in the decision made by the bandwidth-reservation-permission decision unit 91.

Under the above condition, the server 42 sends a Path message a to the RSVP-incompatible router 70 in accordance with the RSVP protocol. The RSVP-incompatible router 70 does not process the Path message a in accordance with the RSVP protocol, and the Path-message transmission unit 72 sends a Path message b to the RSVP-compatible router 50 in accordance with the RSVP protocol.

When the Path-message reception unit 51 in the RSVP-compatible router 50 receives the Path message b, the RSVP-compatible router 50 obtains from the Path message b information on the path of the Path message b from its source to the RSVP-compatible router 50, and stores the information on the path in the path memory unit 52. Thereafter, the Path-message transmission unit 53 sends a Path message c to the client 41 in accordance with the RSVP protocol.

The client 41 sends a Resv message d to the RSVP-compatible router 50 in accordance with the RSVP protocol in order to request a bandwidth reservation service. In an example of the request for the bandwidth reservation, the user name is "Kurose," and the bandwidth is "5 Mbps."

When the Resv-message reception unit 54 in the RSVP-compatible router 50 receives the Resv message d in accordance with the RSVP protocol, the Resv message d is transferred to the permission request unit 55. The permission request unit 55 supplies to the COPS transmission unit 59 permission request data f which requests a decision as to whether to permit the bandwidth reservation or not, and the COPS transmission unit 59 sends the permission request data f to the policy server 80.

The COPS reception unit 90 in the policy server 80 receives the permission request data f, and transfers the permission request data f to the bandwidth-reservation-permission decision unit 91. The bandwidth-reservation-permission decision unit 91 makes a decision as to whether to permit the bandwidth reservation or not, based on the dynamic network information table 82 and the bandwidth-reservation-decision policy table 89, which is provided in the policy server 80 in advance. When the bandwidth-reservation-decision policy table 89 is the table illustrated in FIG. 6, the bandwidth-reservation-permission decision unit 91 recognizes that the permission request data f does not exceed the limit of the bandwidth-reservation-decision policy. In addition, when the dynamic network information table 82 is the dynamic network information table illustrated in FIG. 14, the bandwidth-reservation-permission decision unit 91 recognizes that the path between the RSVP-compatible router 50 and the RSVP-incompatible router 70 is not congested. Based on the above recognitions, the bandwidth-reservation-permission decision unit 91 makes a decision to permit the bandwidth reservation. The COPS transmission unit 92 sends the decision to permit the bandwidth reservation as permission result information g to the RSVP-compatible router 50. In addition, when the permission result information g indicates permission, details of the permission are supplied to the target-apparatus determining unit 84 and the service mapping unit 86. The target-apparatus determining unit 84 determines the location of the RSVP-incompatible router 70 based on the above details of the permission and the contents of the path information table 83. Since the contents of the dynamic network information table 82 are reflected in the path information table 83, it is possible to respond to dynamic changes of paths in the network or failure in apparatuses. The dynamic changes of paths in the network may be caused, for example, when a difference occurs between the initial and current contents of the path information table. For example, when the path information table 83 is the path information table illustrated in FIG. 7, the RSVP-incompatible router 70 (the apparatus C) is located next to the RSVP-compatible router 50 (the apparatus B), and the path between the RSVP-compatible router 50 and the RSVP-incompatible router 70 is not congested. Therefore, the RSVP-incompatible router 70 is determined to be a target apparatus. The target-apparatus determination information is supplied to the service mapping unit 86, which determines a value to be set in the RSVP-incompatible router 70, by using the service mapping table 85 based on the bandwidth-reservation information obtained from the bandwidth-reservation-permission decision unit 91. When the service mapping table 85 in the policy server 80 is the service mapping table illustrated in FIG. 8, the apparatus setting unit 87 performs a setting operation so as to assign the priority of "3" to the user name "Kurose," since the bandwidth-reservation information on the RSVP-compatible router 50, which is received by the COPS reception unit 90, includes the user name "Kurose" and the reserved bandwidth of "5 Mbps." The setting information is sent through the SNMP transmission unit 88 to the RSVP-incompatible router 70.

The RSVP-incompatible router 70 receives the setting information h through the SNMP reception unit 75, and the bandwidth-reservation-item setting unit 76 performs an operation of setting a bandwidth-reservation item. At this time, the service mapping unit 77 determines the bandwidth-reservation item corresponding to the priority assignment "3," and the bandwidth-reservation execution unit 78 executes the bandwidth reservation in accordance with the determined bandwidth-reservation item.

The RSVP-compatible router 50 receives the permission result information g through the COPS reception unit 57. Since, in this case, the permission result information g indicates permission, the permission result information g is transferred to the bandwidth-reservation decision unit 58, which sends a Resv message i through the Resv-message transmission unit 56 to the RSVP-incompatible router 70 in accordance with the RSVP protocol. When the permission result information g indicates rejection, the bandwidth-reservation decision unit 58 sends rejection information n to the client 41. In addition, when the permission result information g indicates permission, the bandwidth-reservation-item setting unit 60 sets a value of an item corresponding to the bandwidth reservation parameter by using the service mapping unit 61. Then, the bandwidth-reservation execution unit 62 assigns a bandwidth of "5 Mbps" as a reserved bandwidth for the communication with the user name "Kurose."

The Resv-message reception unit 73 in the RSVP-incompatible router 70 receives a Resv message i in accordance with the RSVP protocol. However, since the RSVP-incompatible router 70 cannot process the Resv message 1, the Resv-message transmission unit 74 sends the Resv message i as a Resv message j to the server 42 in accordance with the RSVP protocol.

As explained above, in the sixth embodiment, when the RSVP-compatible router 50 receives a service request for a bandwidth reservation, the policy server 80 can dynamically make a decision as to whether to grant the service request or not, based on the bandwidth-reservation-decision policy table 89 and the dynamic network information table 82. In addition, the policy server 80 can dynamically determine the router 70 as a service-incompatible router on the path, based on information received in the admission control and the path information table 83 in which the contents of the dynamic network information table 82 are reflected. Thus, the policy server 80 can assign a service to the service-incompatible router. Therefore, it is possible to effectively utilize RSVP-incompatible network resources in a dynamically varying network environment in which RSVP-compatible routers and RSVP-incompatible routers are mixed.

The details of the operations realized by the functions which computers constituting the policy servers 80 described above can be written as programs stored in computer-readable recording mediums. The operations described above can be realized by the computers by executing the programs. The computer-readable recording mediums may be a magnetic storage device, a semiconductor memory, or the like. In order to put the programs into the market, the programs may be stored in a portable storage medium such as a CD-ROM (compact disk read only memory) and a floppy disc. Alternatively, the programs can be stored in a storage device belonging to a first computer, and transferred to a second computer connected through a network to the first computer. Each program can be stored in a hard disk drive or the like belonging to a computer, and loaded into a main memory of the computer when the program is executed by the computer.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A service assignment apparatus for obtaining information on a network-service-provision state of a service-request-compatible apparatus, and setting a network service in a service-request-incompatible apparatus, where said service-request-compatible apparatus can receive a network-service request, and provide a requested network service, and said service-request-incompatible apparatus can undergo an operation, performed by an external apparatus, of setting a network service in the service-request-incompatible apparatus, and provide said network service set by the external apparatus;

said service assignment apparatus comprising:
  network-information collecting means which collects said information on the network-service-provision state of said service-request-compatible apparatus;
  target-apparatus determining means which determines a service-request-incompatible apparatus which cannot provide a network service provided by said service-request-compatible apparatus, based on said information on the network-service-provision state which is collected by said network-information collecting means;
  service mapping means which determines a service which is to be set in said service-request-incompatible apparatus, based on said information on the network-service-provision state which is collected by said network-information collecting means and information on said service-request-incompatible apparatus determined by said target-apparatus determining means; and
  service setting means which sets said service determined by said service mapping means, in said service-request-incompatible apparatus,
  wherein said network-service request received by said service-request-compatible apparatus is a request selected from a list including a bandwidth-reservation request for a quality of service (QoS) control to guarantee bandwidth and a priority-reservation request for a class of service (CoS) control to prioritize traffic.

2. A service assignment apparatus according to claim 1, wherein said target-apparatus determining means comprises,
a path-information table in which network information is provided in advance, and
a target-apparatus determining function which determines said service-request-incompatible apparatus by referring to said path-information table, based on the network-service-provision state collected by said network-information collecting means.

3. A service assignment apparatus according to claim 2, wherein said target-apparatus determining means further comprises a dynamic-network-information table which stores network information periodically collected by said network-information collecting means from said service-request-compatible apparatus and said service-request-incompatible apparatus, and reflects said network information in said path-information table.

4. A service assignment apparatus according to claim 2, further comprising network-service-provision-permission-decision means which receives from said service-request-compatible apparatus a request for decision as to whether to permit provision of a network service in response to a network-service request received by said service-request-compatible apparatus, makes a decision as to whether to permit provision of the network service, sends a result of the decision to said service-request-compatible apparatus, and supplies information on permission, as said information on the network-service-provision state of said service-request-compatible apparatus, to said target-apparatus determining function and said service mapping means.

5. A service assignment apparatus according to claim 4, wherein said network-service-provision-permission-decision means comprises,
a policy table in which a rule for permission with respect to a network-service request is specified in advance, and
a permission decision function which makes said decision as to whether to permit provision of said network service in response to said request for decision received from said service-request-compatible apparatus, by referring to said policy table.

6. A service assignment apparatus according to claim 4, wherein said target-apparatus determining means further comprises a dynamic-network-information table which stores network information periodically collected by said network-information collecting means from said service-request-compatible apparatus and said service-request-incompatible apparatus, and reflects said network information in said path-information table.

7. A service assignment apparatus according to claim 5, wherein said target-apparatus determining means further comprises a dynamic-network-information table which stores network information periodically collected by said network-information collecting means from said service-request-compatible apparatus and said service-request-incompatible apparatus, and supplies said network information, as data for use in the decision as to whether to permit provision of the network service, to said permission decision function.

8. A service assignment apparatus according to claim 5, wherein said target-apparatus determining means further comprises a dynamic-network-information table which stores network information periodically collected by said network-information collecting means from said service-request-compatible apparatus and said service-request-incompatible apparatus, reflects said network information in said path-information table, and supplies said network information, as data for use in the decision as to whether to permit provision of the network service, to said permission decision function.

9. A service assignment method for assigning a service corresponding to a network-service request received by a service-request-compatible apparatus, to a service-request-incompatible apparatus being incapable of providing a network service which said service-request-compatible apparatus can provide, where said service-request-compatible apparatus and said service-request-incompatible apparatus are located on an identical communication path,
said method comprising the steps of:
obtaining information on a network-service-provision state of said service-request-compatible apparatus;
detecting a service-request-incompatible apparatus to which a service is to be assigned, based on path information which is provided in advance and network information on said service-request-compatible apparatus of which said information on the network-service-provision state is obtained;
making a parameter conversion from said information on the network-service-provision state and information on said service-request-incompatible apparatus determined by said target-apparatus determining means, into a service which can be set in said service-request-incompatible apparatus; and
setting said service into which said parameter conversion is made, in said service-request-incompatible apparatus,
wherein said network-service request received by said service-request-compatible apparatus is a request selected from a list including a bandwidth-reservation request for a quality of service (QoS) control to guarantee bandwidth and a priority-reservation request for a class of service (CoS) control to prioritize traffic.

10. A computer-readable storage medium storing a service assignment program comprising:
network-information collecting means which collects information on a network-service-provision state of a service-request-compatible apparatus, and periodically collects network information from said service-request-compatible apparatus and a service-request-incompatible apparatus;
target-apparatus determining means which determines a service-request-incompatible apparatus which cannot provide a network service provided by said service-request-compatible apparatus, based on said information on the network-service-provision state and/or said network information;
service mapping means which determines a service which is to be set in said service-request-incompatible apparatus, based on said information on the network-service-provision state and information on said service-request-incompatible apparatus determined by said target-apparatus determining means;
service setting means which sets said service determined by said service mapping means, in said service-request-incompatible apparatus; and
network-service-provision-permission-decision means which receives from said service-request-compatible apparatus a request for decision as to whether to permit provision of a network service in response to a network-service request received by said service-request-compatible apparatus, makes a decision as to whether to permit provision of the network service, sends a result of the decision to said service-request-compatible apparatus, and supplies information on permission, as said information on the network-service-provision state of said service-request-compatible apparatus, to said target-apparatus determining function, wherein said network-service request received by said service-request-compatible apparatus is a request selected from a list including a bandwidth-reservation request for a quality of service (QoS) control to guarantee bandwidth and a priority-reservation request for a class of service (CoS) control to prioritize traffic.

* * * * *

UNITED STATES PATENT AND TRADEMARK OFFICE
CERTIFICATE OF CORRECTION

PATENT NO. : 7,076,540 B2 Page 1 of 1
APPLICATION NO. : 09/788842
DATED : July 11, 2006
INVENTOR(S) : Yoshitoshi Kurose et al.

It is certified that error appears in the above-identified patent and that said Letters Patent is hereby corrected as shown below:

Title Page, item (63) Related U.S. Application Data
should read -- Continuation of application No. PCT/JP98/03913, filed on August 31, 1998 --

Col 1, line 3 should read
-- This application is a continuation of international application number PCT JP98/03913, filed August 31, 1998. --

Signed and Sealed this

Seventh Day of November, 2006

JON W. DUDAS
*Director of the United States Patent and Trademark Office*